(12) United States Patent
Gogo et al.

(10) Patent No.: US 7,306,248 B2
(45) Date of Patent: Dec. 11, 2007

(54) STEERING DAMPER DEVICE

(75) Inventors: Kazuhiko Gogo, Wako (JP); Akimi Watanabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 134 days.

(21) Appl. No.: 11/084,016

(22) Filed: Mar. 21, 2005

(65) Prior Publication Data
US 2005/0212250 A1 Sep. 29, 2005

(30) Foreign Application Priority Data
Mar. 23, 2004 (JP) .............................. 2004-085400

(51) Int. Cl.
*B62K 21/08* (2006.01)
(52) U.S. Cl. ........................................ 280/272; 280/90
(58) Field of Classification Search ................ 280/271, 280/272, 89, 90; 180/219
See application file for complete search history.

(56) References Cited

U.S. PATENT DOCUMENTS

| | | | | |
|---|---|---|---|---|
| 615,961 A | * | 12/1898 | Doyle | 280/272 |
| 2,087,535 A | * | 7/1937 | Dall | 280/272 |
| 4,558,878 A | * | 12/1985 | Motrenec | 280/272 |
| 4,811,807 A | * | 3/1989 | Schier | 180/421 |
| 5,052,528 A | * | 10/1991 | Sullivan | 188/317 |
| 5,076,383 A | * | 12/1991 | Inoue et al. | 180/417 |
| 5,383,676 A | * | 1/1995 | Valentino | 280/271 |
| 5,620,194 A | * | 4/1997 | Keeler et al. | 280/81.6 |
| 2005/0151341 A1 | * | 7/2005 | Iwamoto et al. | 280/272 |

FOREIGN PATENT DOCUMENTS

JP 61-285186 * 12/1986

OTHER PUBLICATIONS

EPO Office Action dated May 16, 2006.

* cited by examiner

*Primary Examiner*—Kevin Hurley
(74) *Attorney, Agent, or Firm*—Westerman, Hattori, Daniels & Adrian, LLP.

(57) ABSTRACT

A steering damper device having a cylindrical damper disposed between a steering side member and a vehicle body side member, wherein said cylindrical damper includes a damper casing and a damper rod which is slidably displaced in the damper casing. The amount of slidable displacement of the damper rod with respect to a steering angle of the handlebar is small when the steering angle of the handlebar is near 0° and the amount of slidable displacement is larger as the steering angle is progressively changed from 0°. The damping coefficient of the cylindrical damper is large when the steering angle of the handlebar is near 0° and the damping coefficient is smaller when the steering angle is progressively changed from 0°.

3 Claims, 20 Drawing Sheets

When the handlebar is in the neutral position

When the handlebar is turned to the left (right)

STEERING DAMPER DEVICE

FIELD OF INVENTION

The present invention relates generally to a steering damper device used for small-sized vehicles such as motorcycles.

BACKGROUND OF THE INVENTION

In general, motorcycles are steered by operating a handlebar so as to turn a front fork supporting a front wheel around a steering stem. The steering stem is rotatably inserted into a head pipe located at the front end of a body frame. Such motorcycles are sometimes equipped with a steering damper device between a steering side member which is turned by operating the handlebar and a body side member which is not turned by operating the handlebar. In this case, the steering damper device requires at least the following conditions: damping moment is scarcely generated during normal traveling in which the steering angle of a handlebar is small and its angular speed is low; high-damping moment is generated in the range where the steering angle of the handlebar is large and the angular speed is high; and the damping moment is scarcely generated while the handlebar which has been turned is returned.

The present inventors have proposed a steering damper device that can meet such requirements using a cylindrical damper which is simple in configuration and low in cost (Japanese Patent Application No. 2003-301072). This steering damper device is configured such that the damper is composed of a damper casing and a damper rod, one of them is rotatably connected to a vehicle body side member such as a head pipe or the like, and the other is rotatably connected to a steering side member such as a fork bridge or the like. The damper is disposed so as to be most contracted or extended when the handlebar is in the neutral position, that is, when the steering angle of the handlebar is 0°.

With such a steering damper device, when the handlebar is turned to the right or left, the damper rod of the damper is slidably displaced in the damper casing in the same direction, which provides symmetrical damper-characteristics. When the handlebar is returned, the damper rod is slidably displaced in the opposite direction; therefore, a damping force can be allowed to be scarcely generated at that time. In addition, the amount of slidable displacement of the damper rod relative to the steering angle of the handlebar is small when the steering angle is in the vicinity of 0°; it is greater as the steering angle is larger than 0°. Likewise, the damping force applied to the steering side member from the damper is small when the steering angle of the handlebar is near 0°; it is greater as the steering angle is progressively changed from 0°. Thus, the damping force is scarcely generated during normal traveling in which the steering angle of the handlebar is small and the angular speed is low, and high-damping moment is generated in the range where the steering angle of the handlebar is large and the angular speed is high.

SUMMARY OF THE INVENTION

Incidentally, the steering damper device with the cylindrical damper disposed in the way described above will have, in view of dynamics of mechanism, characteristics in which the damping moment is increased as the steering angle of the handlebar is increased. While such characteristics are basically desirable for the steering damper device, the rider may feel hard steering when a large steering angle is required during low speed traveling.

The present invention has been made in view of the foregoing and it is an object of the present invention to provide a steering damper device capable of assisting in operating a handlebar relatively nimbly even in the range of large steering angles of the handlebar.

In order to achieve the above object, a first embodiment of the present invention provides a steering damper device having a cylindrical damper which is provided between a steering side member turned around a steering stem by operating a handlebar and a vehicle body side member not turned by operating the handlebar. The cylindrical damper includes a damper casing and a damper rod which is slidably displaced in the damper casing. As shown, for example, the steering damper device is characterized in that an amount of slidable displacement of the damper rod with respect to a steering angle of the handlebar is small when the steering angle of the handlebar is in the vicinity of 0° and the amount of slidable displacement is larger as the steering angle is progressively changed from 0°; and that a damping coefficient of the cylindrical damper is large when the steering angle of the handlebar is in the vicinity of 0° and the damping coefficient is smaller when the steering angle is progressively changed from 0°.

Therefore, basically, the damping force is scarcely generated in the range of the small steering angles of the handlebar and it is increased as the steering angle is lager. Furthermore, the damping coefficient of the cylindrical damper, i.e., the magnitude of the damping force relative to the amount of slidable displacement of the damper rod is small in the range of the large steering angles; therefore, the damping force is prevented from being extremely increased even when the handlebar is fully turned. Because of this, the rider is prevented from feeling hard steering during low-speed traveling which may require large steering angles while characteristics required for the steering damper device for motorcycles or the like are maintained in which the damping force is increased according to the increased steering angle of the handlebar.

According to another embodiment of the present invention, a steering damper device having a cylindrical damper is provided between a steering side member turned around a steering stem by operating a handlebar and a vehicle body side member not turned even by operating the handlebar. The cylindrical damper includes a damper casing and a damper rod which is slidably displaced in the damper casing. As shown, for example, the steering damper device is characterized in that a damping force applied to the steering side member from the cylindrical damper is small when a steering angle of the handlebar is in the vicinity of 0° and the damping force is larger as the steering angle is progressively changed from 0°; and that a damping coefficient of the cylindrical damper is large when the steering angle of the handlebar is in the vicinity of 0° and the damping coefficient is smaller when the steering angle is progressively changed from 0°.

Therefore, the rider is prevented from feeling hard steering during low-speed traveling which may require large steering angles while characteristics required for the steering damper device for motorcycles or the like is maintained in which the damping force is increased according to the increased steering angle of the handlebar.

According to another embodiment of the present invention, a steering damper device having a cylindrical damper is provided between a steering side member turned around a steering stem by operating a handlebar and a vehicle body side member not turned even by operating the handlebar. The cylindrical damper having a damper casing and a damper rod is slidably displaced in the damper casing. As shown, for example, the steering damper device is characterized in that an amount of slidable displacement of the damper rod with respect to a steering angle of the handlebar is small when the steering angle of the handlebar is in the vicinity of 0° and the amount of slidable displacement is lager as the steering angle is progressively changed from 0°; in that a damping force applied to the steering side member from the cylindrical damper is small when a steering angle of the handlebar is in the vicinity of 0° and the damping force is larger as the steering angle is progressively changed from 0°; and in that a damping coefficient of the cylindrical damper is large when the steering angle of the handlebar is in the vicinity of 0° and the damping coefficient is smaller as the steering angle is progressively changed from 0°.

BRIEF DESCRIPTION OF THE DRAWINGS

A preferred embodiment of the present invention will be described with reference to the accompanying drawings, wherein.

DETAILED DESCRIPTION OF THE INVENTION

Figure 1:
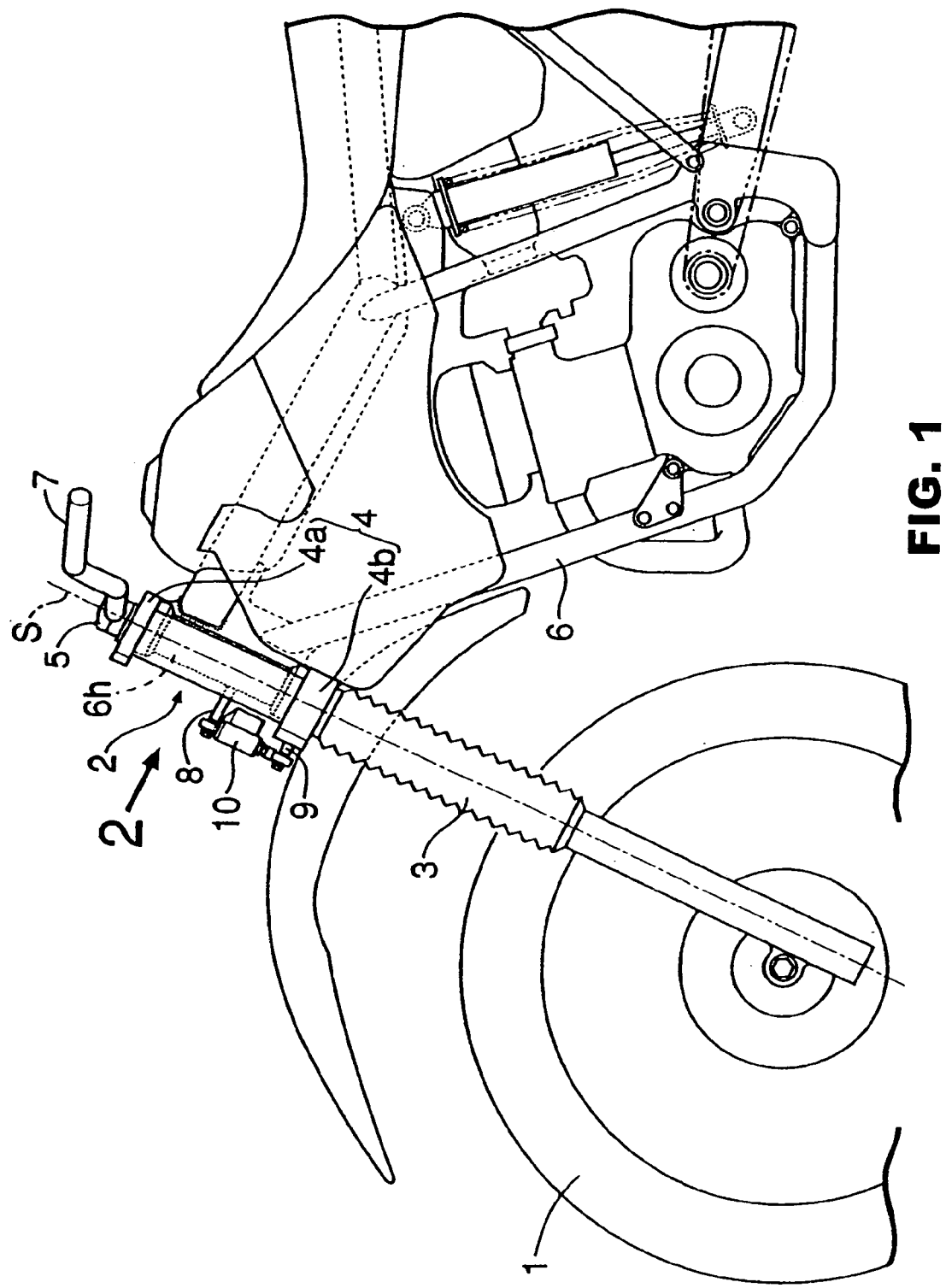
FIG. 1 is a side view of a front portion of a motorcycle equipped with a steering damper device according to a first embodiment of the present invention.

Embodiments of the invention will be described hereinafter with reference to the accompanying drawings. It is to be noted that the drawings should be viewed in the direction of the reference characters.

FIGS. 1 to 10 illustrate a steering damper device according to a first embodiment of the present invention.

Figure 2:
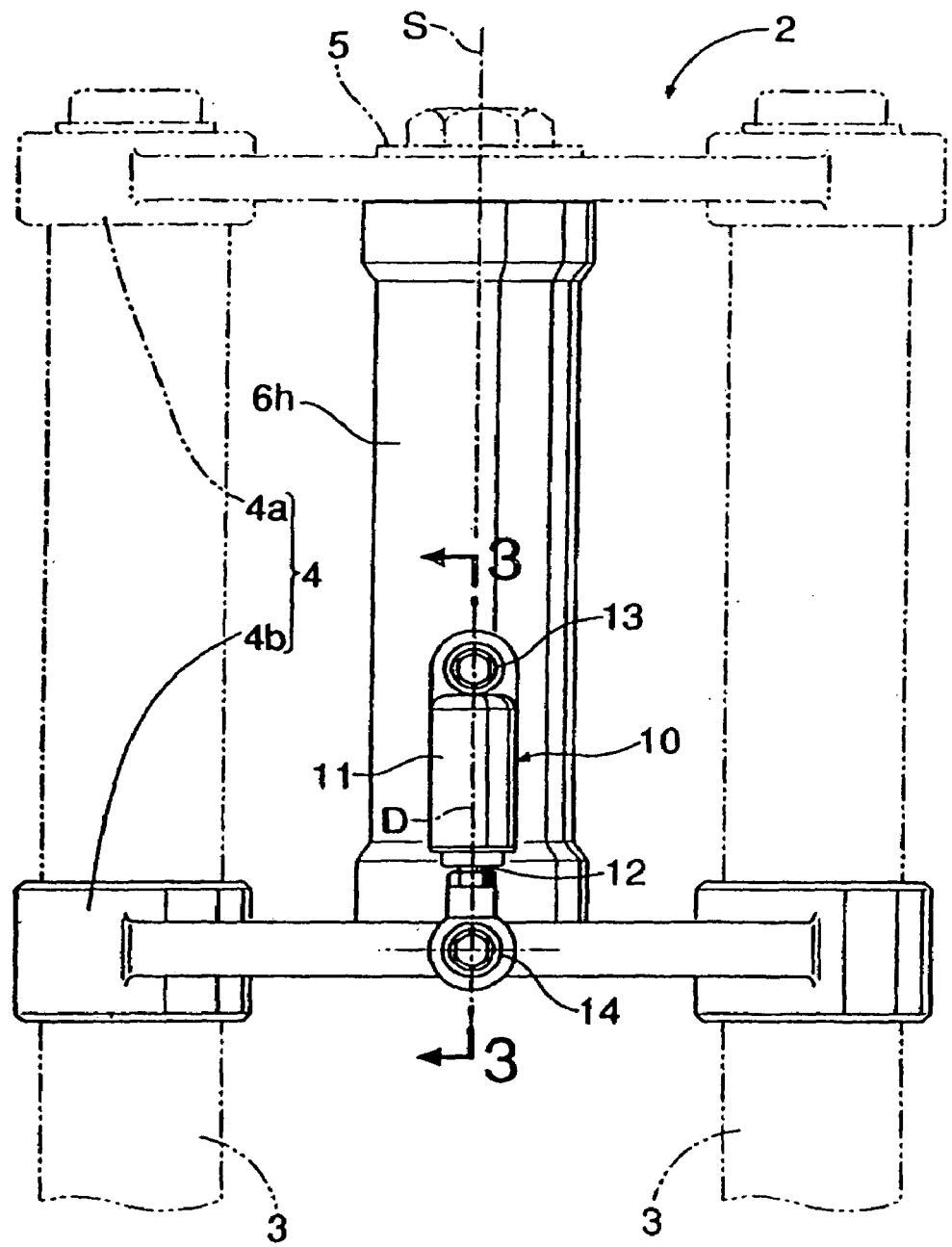
FIG. 2 is a front view of a front fork portion as viewed from the direction of arrow 2 of FIG. 1.

As shown in FIGS. 1 and 2, a front fork 2 supporting a front wheel 1 of a motorcycle includes right and left fork pipes 3, 3 and a fork bridge 4 adapted to couple the upper end portions of the fork pipes 3, 3 together. The fork bridge 4 is comprised of a top bridge 4a and a bottom bridge 4b spaced vertically from and parallel to each other. A steering stem 5 is provided to connect the top and bottom bridges 4a, 4b at a horizontally central position therebetween. The steering stem 5 is rotatably inserted into a head pipe 6h provided at the front end of a body frame 6. A handlebar 7 is attached to the top bridge 4a for steering. Thus, the motorcycle is steered by operating the handlebar 7 to turn the front fork 2 clockwise and counterclockwise around the steering stem 5, thereby turning the front wheel 1 supported by the front fork together therewith.

The head pipe 6h is provided with a stay 8 projecting forward at a position closer to the lower end thereof. The stay 8 is located on the body-central plane extending in the longitudinal direction of the vehicle body. The bottom bridge 4b is provided with another stay 9 projecting forward at the horizontally central position thereof. The cylindrical damper 10 is mounted between both of the stays 8, 9. In other words, the cylindrical damper 10 is disposed in front of the head pipe 6h, extending substantially along the longitudinal direction thereof.

Figure 3:
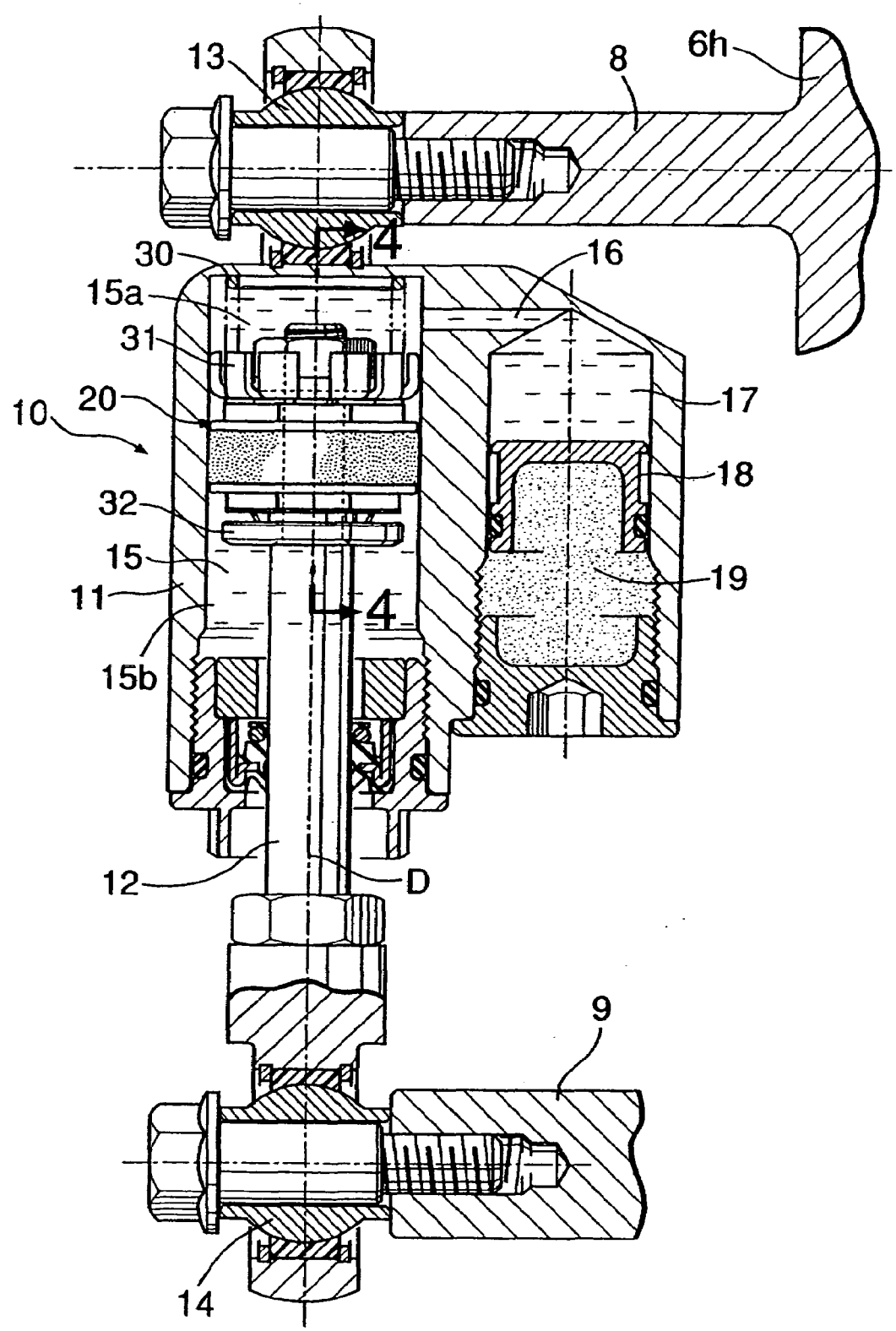
FIG. 3 is a cross-sectional view of a cylindrical damper taken along line 3-3 of FIG. 2.
Figure 4:
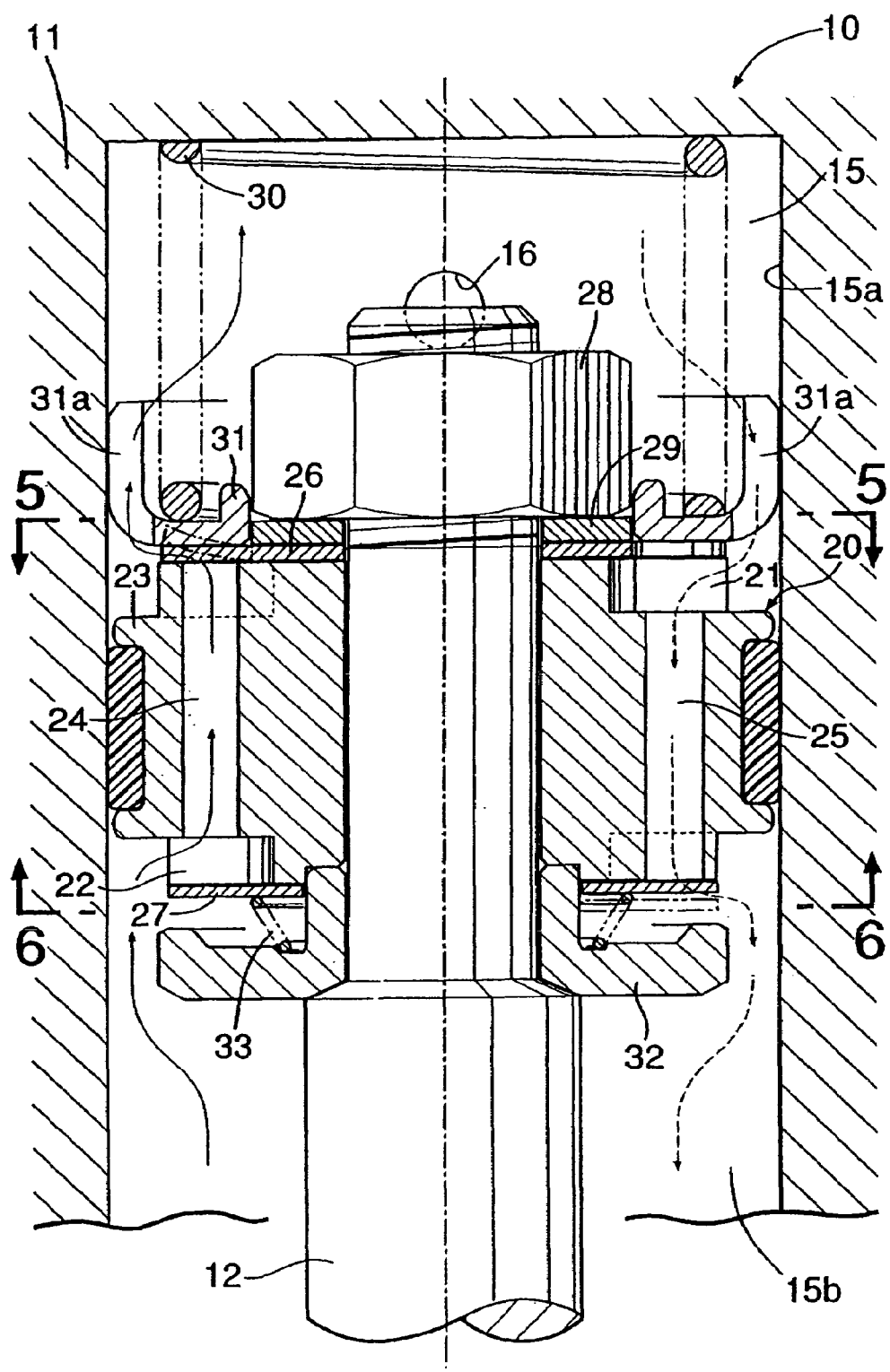
FIG. 4 is an enlarged cross-sectional view taken along line 4-4 of FIG. 3.
Figure 5:
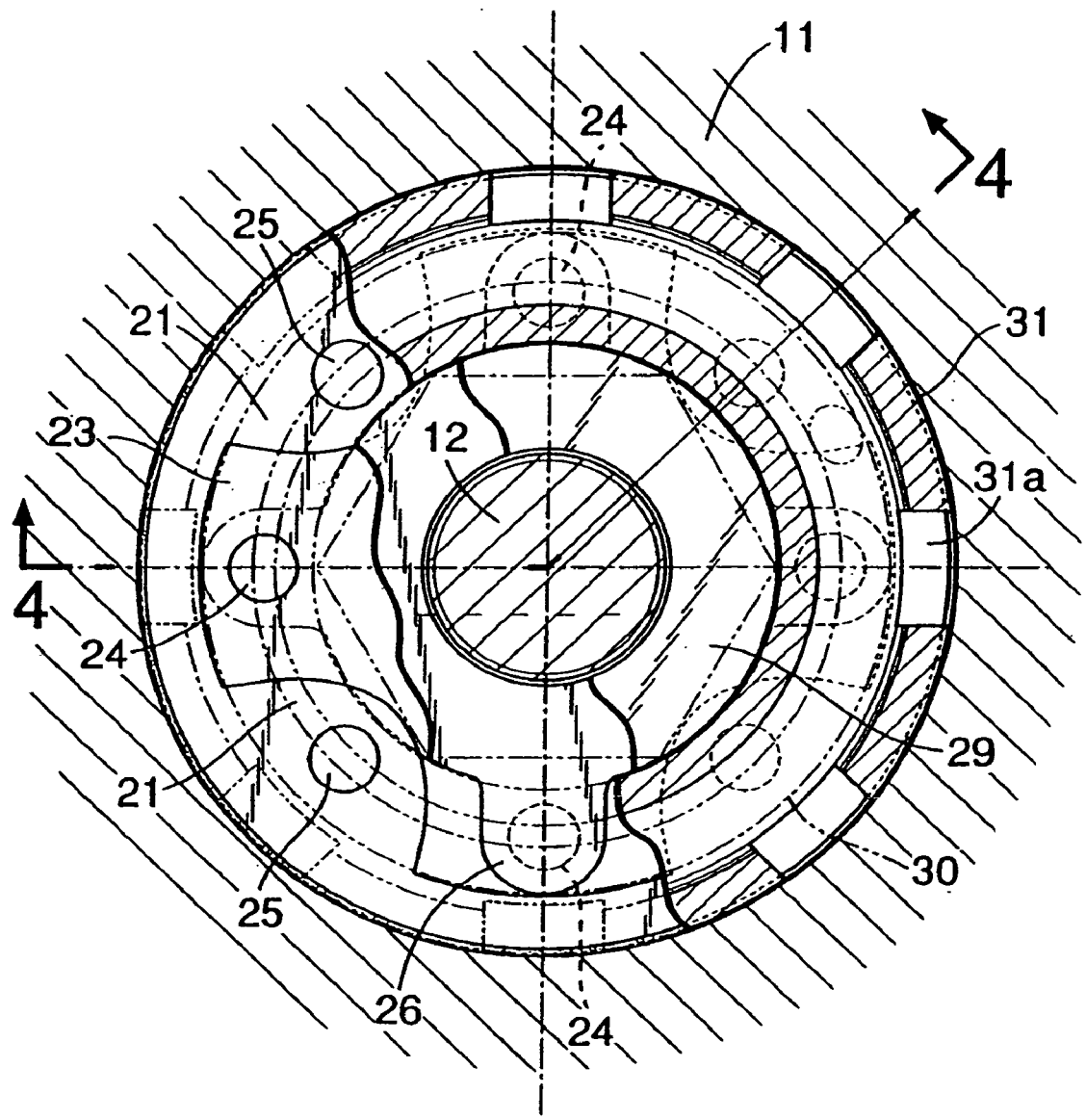
FIG. 5 is a cross-sectional view taken along line 5-5 of FIG. 4.
Figure 6:
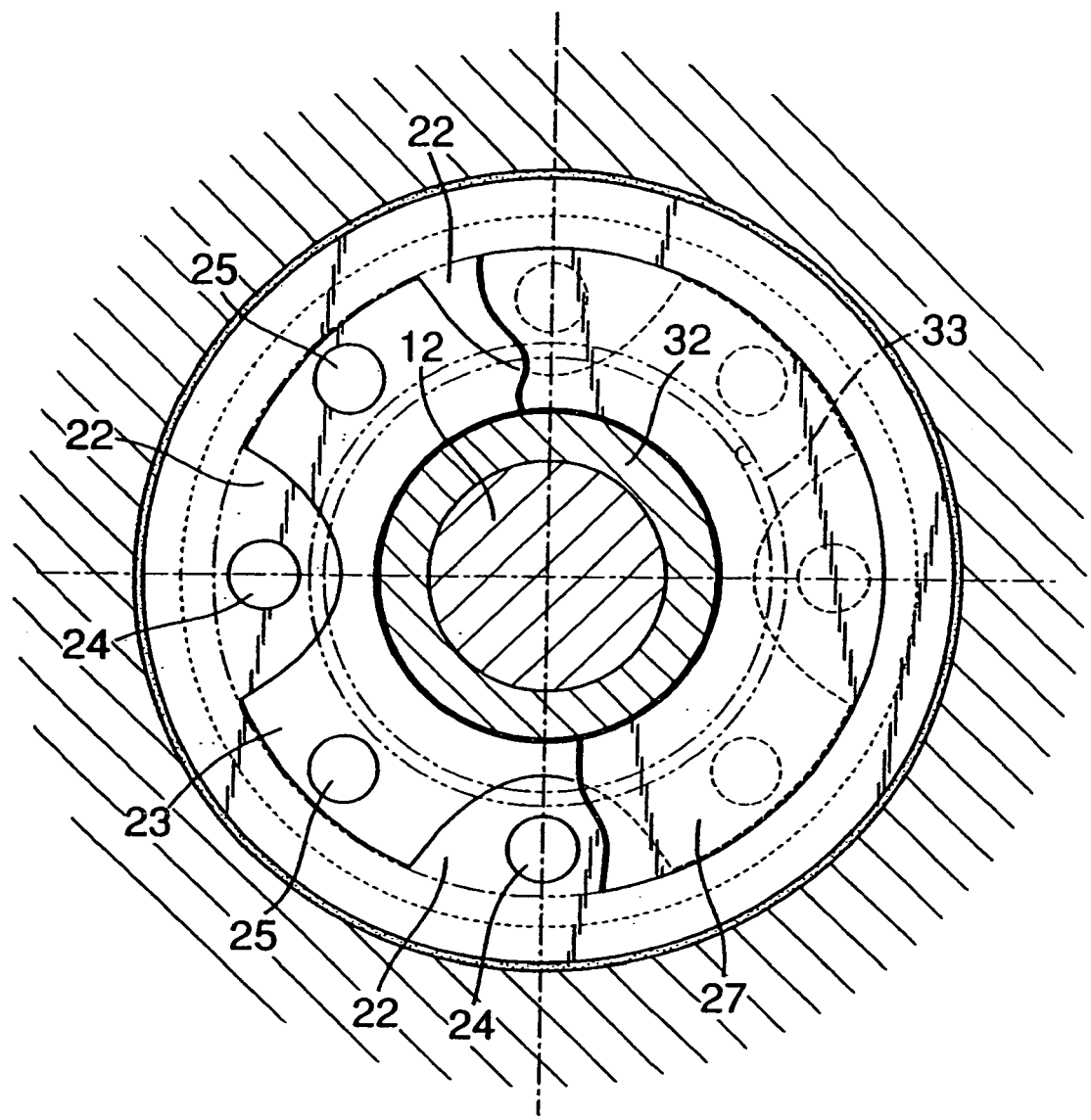
FIG. 6 is a cross-sectional view taken along line 6-6 of FIG. 4.
Figure 7:
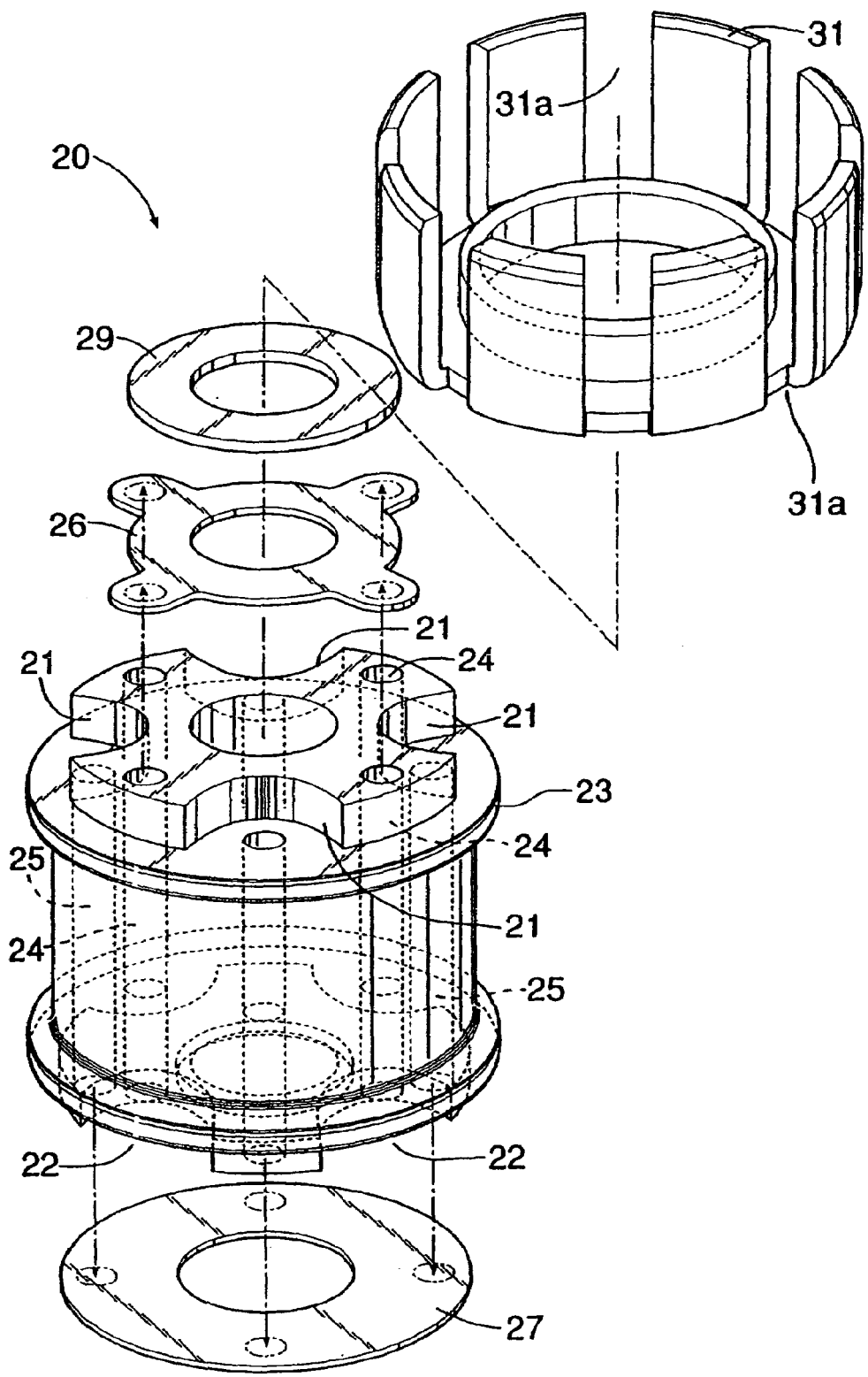
FIG. 7 is an exploded perspective view of the piston of the cylindrical damper.
Figure 8:
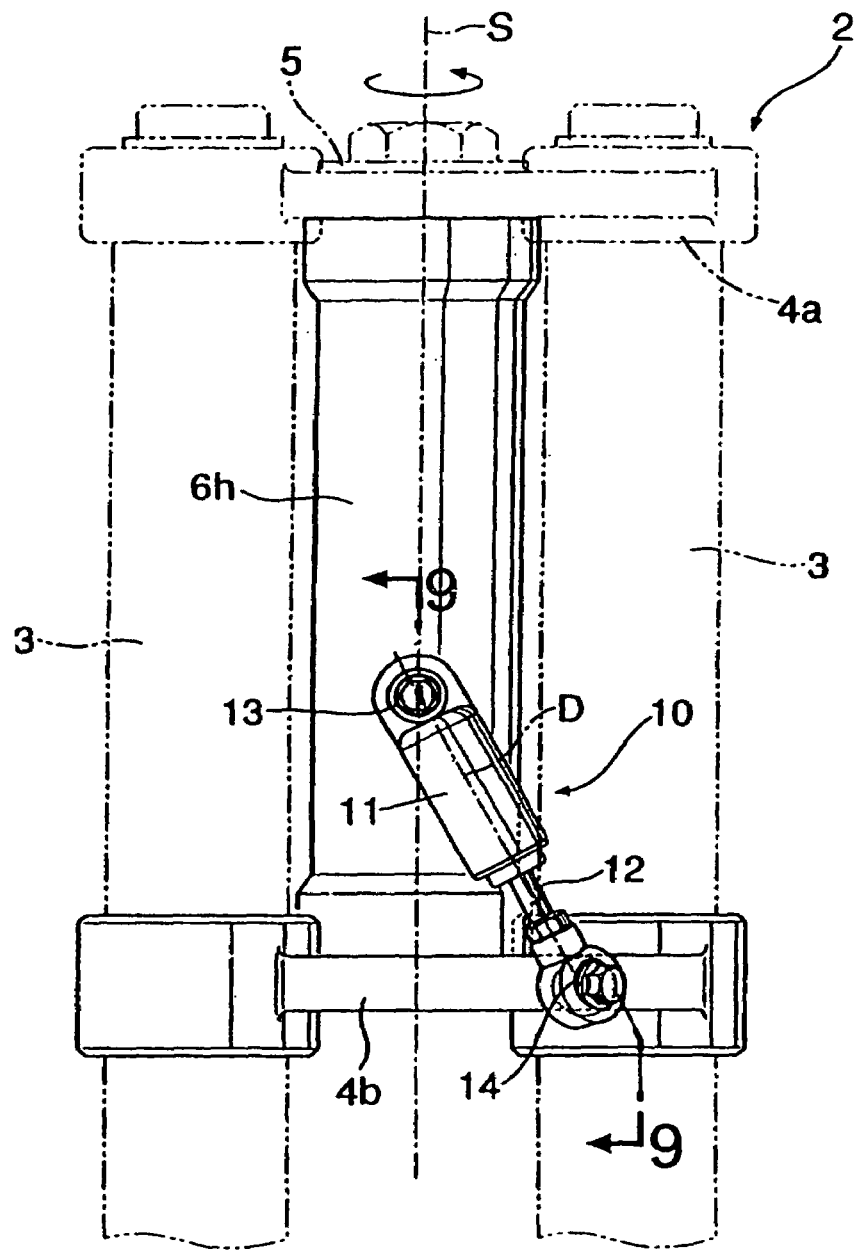
FIG. 8 is a front view, as with FIG. 2, showing a state where a handlebar is turned from the neutral position to the left.
Figure 9:
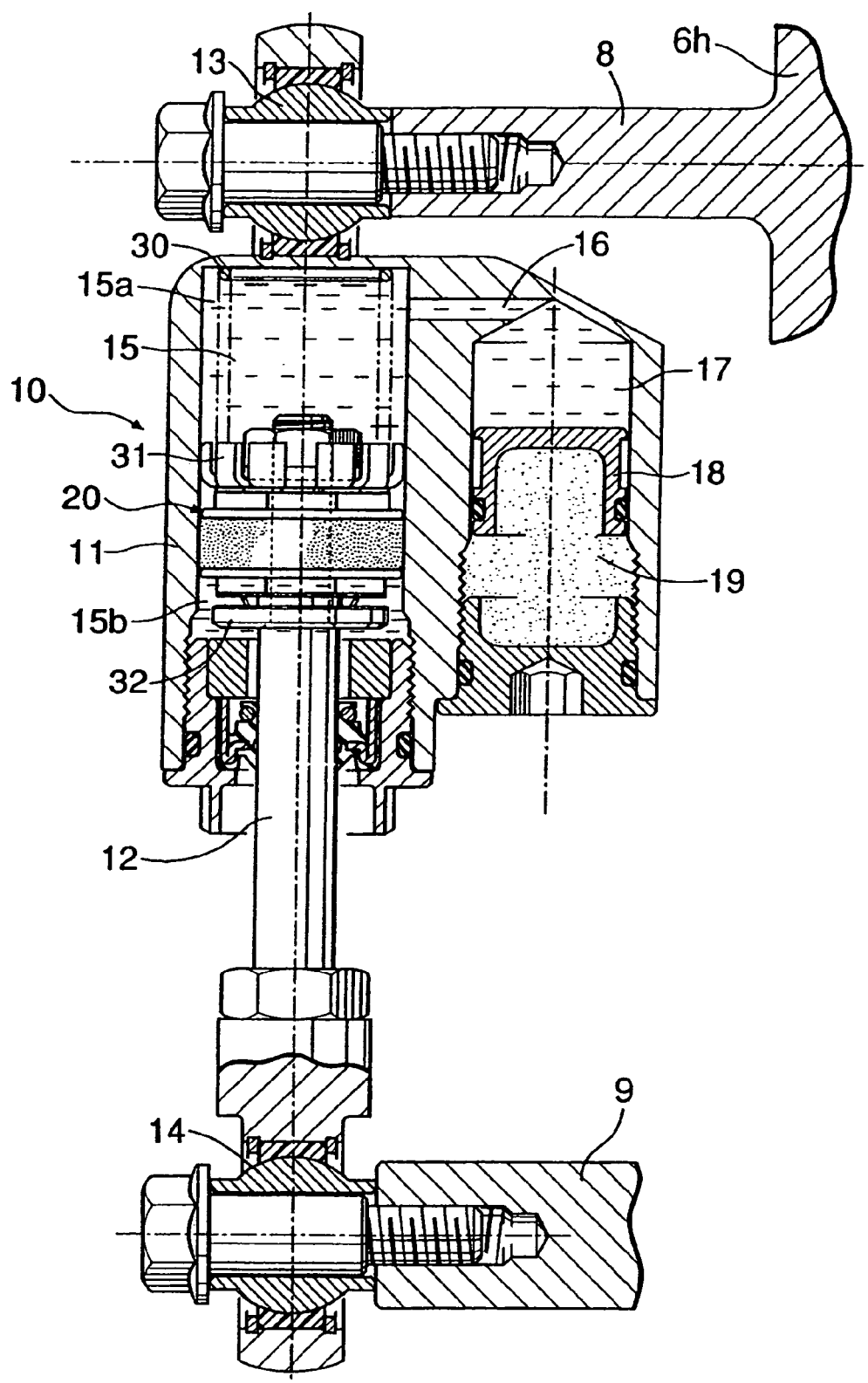
FIG. 9 is a cross-sectional view taken along line 9-9 of FIG. 8.

As shown in FIG. 3, the cylindrical damper 10 is composed of a damper casing 11 and a damper rod 12 which is slidably displaced in the damper casing 11. The damper casing 11 is rotatably connected through a spherical joint 13 to a side of the head pipe 6h, i.e., to the stay 8 on the body side. The damper rod 12 is rotatably connected through a spherical joint 14 to a side of the bottom bridge 4b, i.e., to the stay 9 on the steering side. The central axis of the damper rod 12 slidably displaced in the damper casing 11, i.e., the central axis D of the cylindrical damper 10 is designed to extend along each of the central axes of the spherical joints 13, 14. In this way, the cylindrical damper 10 is mounted between the body frame 6 which is not turned even during the operation of the handlebar 7 and the front fork 2 which is turned by the operation of the handlebar 7.

As shown in FIG. 2, the cylindrical damper 10 is in the most contracted state when the handlebar 7 is in the neutral position, that is, when the steering angle of the handlebar 7 is 0°. In addition to this, the central axis D of the cylindrical damper 10 is allowed to be parallel to the central axis S of the steering stem 5. Thus, the central axis D of the cylindrical damper 10 is located on a plane in the longitudinal direction of the body, including the central axis S of the steering stem 5, that is, on the central plane of the body.

The damper casing 11 of the cylindrical damper 10 includes, as shown in FIG. 3, a damper chamber 15 and a reservoir 17 communicating with the damper chamber 15 via an oil passage 16. The damper chamber 15 and the reservoir 17 are filled with oil. The bottom of the reservoir 17 is defined by a piston 18. The piston 18 is upwardly biased under pressure by a compressed gas 19 filled in a gas chamber located thereunder. The damper chamber 15 is partitioned into two chambers, i.e., upper and lower chambers 15a, 15b, by a piston 20 attached to the top end of the damper rod 12.

As shown in FIGS. 4 to 7, the piston 20 has a piston body 23 formed with pluralities of notches 21, 21, . . . ; 22, 22, . . . on the peripheries of the upper and lower portions thereof, respectively. The piston body 23 is provided with first through-holes 24, 24, . . . and second through-holes 25, 25, . . . , which pass vertically therethrough. The first through-holes 24 open at the respective upper ends into the upper end face of the piston body 23 and at the respective lower ends into the corresponding notches 22, 22, . . . . The second through-holes 25 open at the respective lower ends into the lower end face of the piston body 23 and at the respective upper ends into the corresponding notches 21, 21, . . . . The upper ends of the first through-holes 24 are controllably opened and closed by a valve plate 26 made of an elastic plate; the lower ends of the second through-hole 25 are controllably opened and closed by a similar valve plate 27. The upper valve plate 26 is at its central portion secured through a washer 29 with a nut 28 screwed onto the upper end of the damper rod 12. The upper valve plate 26 is at its peripheral portion biased downwardly under pressure through a washer 31 with a valve spring 30 disposed compressively between the upper end face of the damper chamber 15 and the washer 31. Consequently the upper valve plate 26 is normally maintained in close contact with the upper end face of the piston body 23. The washer 31 is also provided with a plurality of notches 31a, 31a, . . . on the periphery thereof. A valve spring 33 is compressively disposed between the lower valve plate 27 and a valve receiver 32 carried by the damper rod 12. The lower valve plate 27 is at its central portion biased under pressure upwardly. Consequently the lower valve plate 27 is maintained in close contact with the lower end face of the piston body 23. The upper valve spring 30 has a sufficiently greater spring force than the lower valve spring 33.

With this configuration, when the cylindrical chamber 10 equipped with the piston 20 is extended, the piston 20 attached to the top end of the damper rod 12 is slidably displaced toward the lower side of the damper chamber 15, so that pressure in the lower chamber 15b of the damper chamber 15 is increased. This pressure is applied to the bottom side of the valve plate 26 through the first through-holes 24 from the notches 22 on the periphery of the lower end of the piston body 23. The periphery of the valve plate 26 is pushed up against the bias force of the valve spring 30 as denoted by the chain double-dashed line in FIG. 4. That is, it is separated from the upper end face of the piston body 23. This allows the oil in the lower chamber 15b to flow to the upper chamber 15a as denoted by solid arrows in FIG. 4. Thus, the resistance caused by the oil passing through the gap between the valve plate 26 and the piston body 23 generates a damping force. In this case, a load applied to the valve plate 26 from the valve spring 30 will be larger as the amount of deflection, i.e., amount of compression of the valve spring 30 is larger. When the cylindrical damper 10 is contracted, the gap between the valve plate 26 and the piston body 23 is small; the gap is larger as the damper 10 is more extended. Thus, the damping coefficient of the damper 10, i.e., the magnitude of the damping force relative to the amount of slidable displacement of the damper rod 12 is large when the damper is contracted; it is smaller as the damper is more extended.

On the other hand, when the cylindrical damper 10 is contracted, the pressure in the upper chamber 15a of the damper chamber 15 is increased. This downwardly deforms a peripheral portion of the lower valve plate 27 against the biasing force of the valve spring 33 as denoted by a chain double-dashed line in the right-lower portion of FIG. 4. As a result, the valve plate 27 is separated from the lower end face of the piston body 23, which allows the oil in the upper chamber 15a to flow through the second through-hole 25 to the lower chamber 15b, as denoted by the dashed arrows of FIG. 4. In this case, a pressing force is small which is applied to the peripheral portion of the valve plate 27 by the valve spring 33; therefore, the valve plate 27 is easily deformed. Any damping force will scarcely be generated at this time.

A description will then be made of the operation of the steering damper device configured as above.

As described earlier, when the handlebar 7 is in the neutral position, that is, when the steering angle of the handlebar is 0°, the cylindrical damper 10 is in the most contracted, i.e., the shortest state. In this state, if the handlebar 7 is turned to the left for example, then the front fork 2 will be leftward turned around the steering stem 5 which is rotatably inserted into the head pipe 6h of the body frame 6. The bottom bridge 4b constitutes part of the fork bridge 4 of the front fork 2 is turned in the same way. Thus, the spherical joint 14 which couples the stay 9 provided in the horizontally central portion of the bottom bridge 4b to the damper rod 12 of the cylindrical damper 10 is offset from the body central plane extending in the longitudinal direction of the vehicle body. In contrast, the spherical joint 13 which couples the stay 8 provided on the head pipe 6h to the damper casing 11 of the cylindrical damper 10 is not turned even if the handlebar 7 is turned. In other words, the spherical joint 13 is at the original position, that is, on the body central plane extending in the longitudinal direction of the vehicle body. As a result, the cylindrical damper 10 is extended, that is, the damper rod 12 is slidably displaced downwardly in the damper casing 11 in FIG. 3, which causes the damping force.

When the handlebar 7 is turned to the right, the cylindrical damper 10 is extended in the same way, that is, the damper rod 12 is slidably displaced downwardly in FIG. 3, which causes the damping force. In this way, the cylindrical damper 10 is configured such that even when the handlebar 7 is turned to either side, namely, to the right or left from the position where the steering angle of the handlebar 7 is 0°, the damper rod 12 is slidably displaced in the same direction in the damper casing 11.

Figure 10:
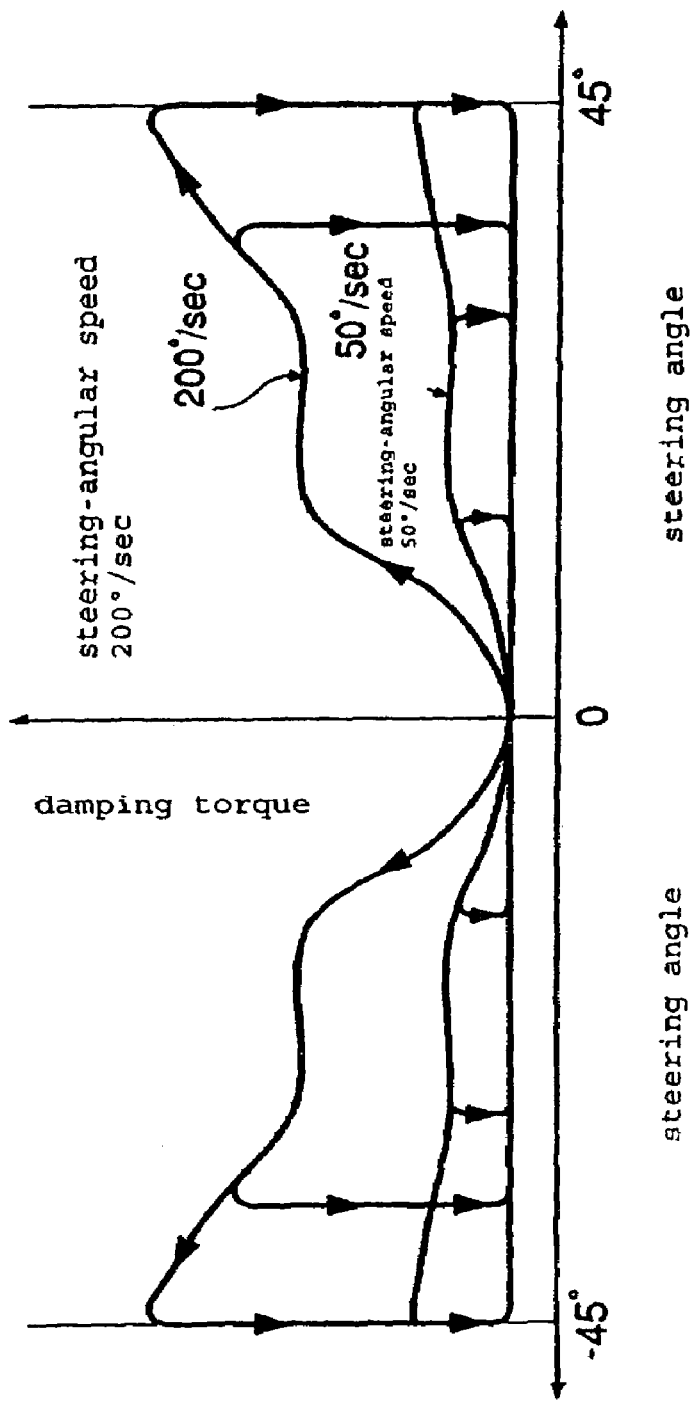
FIG. 10 is a characteristic curve diagram of the steering damper device.

In addition, when the handlebar 7 is turned to the right or left, the amount of extension of the cylindrical damper 10 is the same if the cut angle, namely the steering angle of the handlebar 7 is the same. Thus, the damping force characteristics are symmetrical to each other as shown in FIG. 10.

When the handlebar 7 which has been turned to the right or left is returned to the neutral position, the cylindrical damper 10 is contracted in either case, that is, the damper rod 12 is slidably displaced within the damper casing 11 upwardly in FIG. 3. As described above, the cylindrical damper 10 is designed to scarcely generate the damping force. Therefore, the damping force is scarcely generated when the handlebar which has been turned is returned. In this way, the steering damper device can generate the damping force in either case, that is, when the handlebar 7 is turned to the right or left from the steering angle 0°. In addition, it can make the damping force smaller when the handlebar 7 is returned to the steering angle 0°.

With this steering damper device, the amount of extension of the cylindrical damper 10 relative to the steering angle of the handlebar 7 is small when the handlebar 7 is in the vicinity of the neutral position; in the range of the larger steering angle of the handlebar 7, the damper stroke is gradually increased according to the steering angle of the handlebar 7. More specifically, the amount of slidable displacement of the damper rod 12 relative to the steering angle of the handlebar is small in the vicinity of 0° of the steering angle of the handlebar. In addition, it is increased as the steering angle of the handlebar is progressively changed from 0°. Thus, when the handlebar 7 is turned from the neutral position, damping moment is scarcely generated at its early stage, and gradually increased in the middle stage, as shown in FIG. 10. To be more specific, the damping force applied from the cylindrical damper 10 to the front fork 2 as the steering side member is small in the vicinity of 0° of the handlebar steering angle and it is increased according as the handlebar steering angle is progressively changed from 0°. The damping force continues smoothly from the early stage to the middle stage. In this way, this steering damper device can provide the characteristics desirable and preferable for steering damper devices for motorcycles.

As described earlier, the damping coefficient of the cylindrical damper 10, i.e., the magnitude of the damping force relative to the amount of slidable displacement of the damper rod 12 is large when the damper 10 is contracted; it is smaller as the damper 10 is more extended. More specifically, the damping coefficient is large when the handlebar steering angle is in the vicinity of 0°; it is smaller as the handlebar steering angle is progressively changed from 0°. Accordingly, in the range of the increased handlebar steering angles, while the amount of the slidable displacement of the damper rod 12 relative to the steering angle of the handlebar is increased, the damping force is not increased so much. As a result, the increase in damping moment is small in the range of the increased steering angle of the handlebar; therefore, the handlebar can be operated nimbly even if it is turned fully to either side during the motorcycle is traveling at low speeds.

FIGS. 11 to 14 illustrate a steering damper device according to another embodiment of the present invention.

Incidentally, this embodiment is the same as the first embodiment in terms of the overall configuration but with a cylindrical damper adopted. Components corresponding to those in the first embodiment are therefore denoted by the same reference numerals and the duplicate explanation will be omitted.

A cylindrical damper 40 of this embodiment is provided with a groove 41 on the circumferential wall of a damper chamber 15 in place of the valve spring 30 of the cylindrical damper 10 in the first embodiment.

More specifically, also in the cylindrical damper 40 in this embodiment, the piston body 23 of a piston 20 is attached to the top end of a damper rod 12 and is formed with pluralities of notches 21, 21, . . . ; 22, 22, . . . on the peripheries of the upper and lower portions thereof, respectively. The piston body 23 is provided with first through-holes 24, 24, . . . and second through-holes 25, 25, . . . , which pass vertically therethrough. The first through-holes 24 open at the respective upper ends into the upper end face of the piston body 23 and at the respective lower ends into the corresponding notches 22. The second through-holes 25 open at the respective lower ends into the lower end face of the piston body 23 and at the respective upper ends into the corresponding notches 21. The upper ends of the first through-holes 24 are controllably opened and closed by a valve plate 26 made of an elastic plate; the lower ends of the second through-holes 25 are controllably opened and closed by a similar valve plate 27. The upper valve plate 26 has relatively high-rigidity and is at its central portion secured through a washer 29 with a nut 28 screwed onto the upper end of the damper rod 12. The upper valve plate 26 is normally retained in close contact with the upper end face of the piston body 23. The lower valve plate 27 is at its central portion biased under pressure upwardly by a valve spring 33 compressively disposed between the valve plate 27 and a spring receiver 32 carried on the damper rod 12. Consequently the lower valve plate 27 is maintained in close contact with the lower end face of the piston body 23. The valve spring 33 has a small spring force.

The damper chamber 15 is formed with the groove 41 on the circumferential wall at a location which faces the piston body 23 when the cylindrical damper 40 is extended. The groove 41 extends vertically greater than the vertical dimension of the piston body 23.

Figure 11:
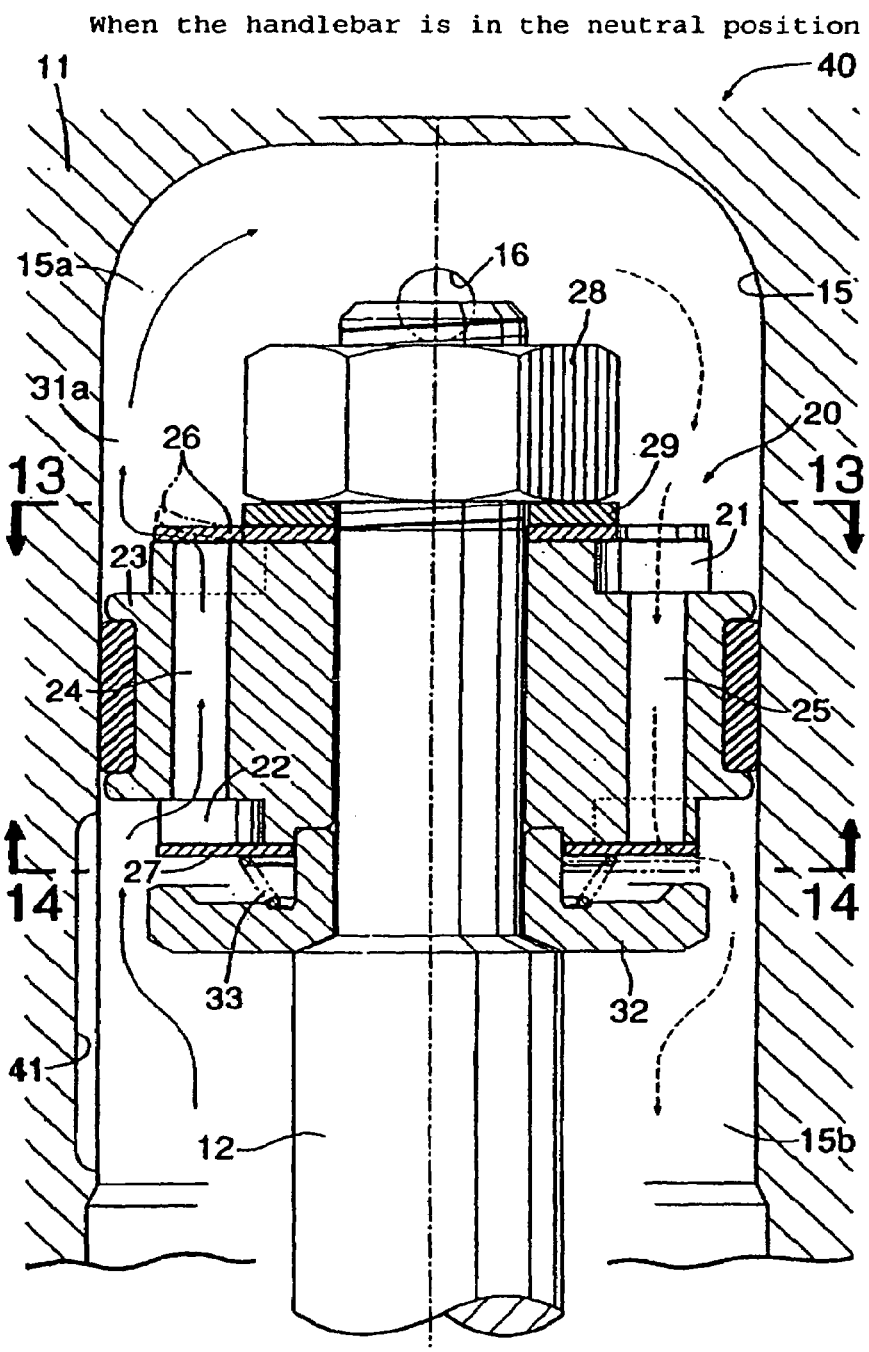
FIG. 11 is a longitudinal sectional side view showing the cylindrical damper of the steering damper device according to another embodiment of the present invention.

With the steering damper device provided with the cylindrical damper 40 having such a configuration, when a handlebar 7 is in the neutral position and the cylindrical damper 40 is most contracted, as shown in FIG. 11 the outer circumference of the piston body 23 is in entire contact with the inner circumference of the damper chamber 15. When the handlebar 7 is turned to the right or left from this state, the damper 40 is extended, that is, the piston 20 attached to the top end of the damper rod 12 is slidably displaced toward the lower portion of the damper chamber 15. This increases the pressure in the lower chamber 15b of the damper chamber 15. The pressure is applied from the notches 22 on the outer periphery of the lower end of the piston body 23 through the first through-holes 24 to the bottom side of the valve plate 26. As a result, the outer peripheral portion of the valve plate 26 is pushed up as denoted by double-dashed lines in FIG. 11, that is, separated from the upper end face of the piston body 23. The oil in the lower chamber 15b is allowed to flow to the upper chamber 15a as denoted by solid arrows in FIG. 11. Thus, resistance caused by the oil passing through the gap between the valve plate 26 and the piston body 23 generates a damping force. In this case, since the valve plate 26 has high-rigidity and is relatively less deformable, the gap defined between the valve plate 26 and the piston body 23 at that time is small. Accordingly, the damping coefficient of the damper 40 is large at that time.

Figure 12:
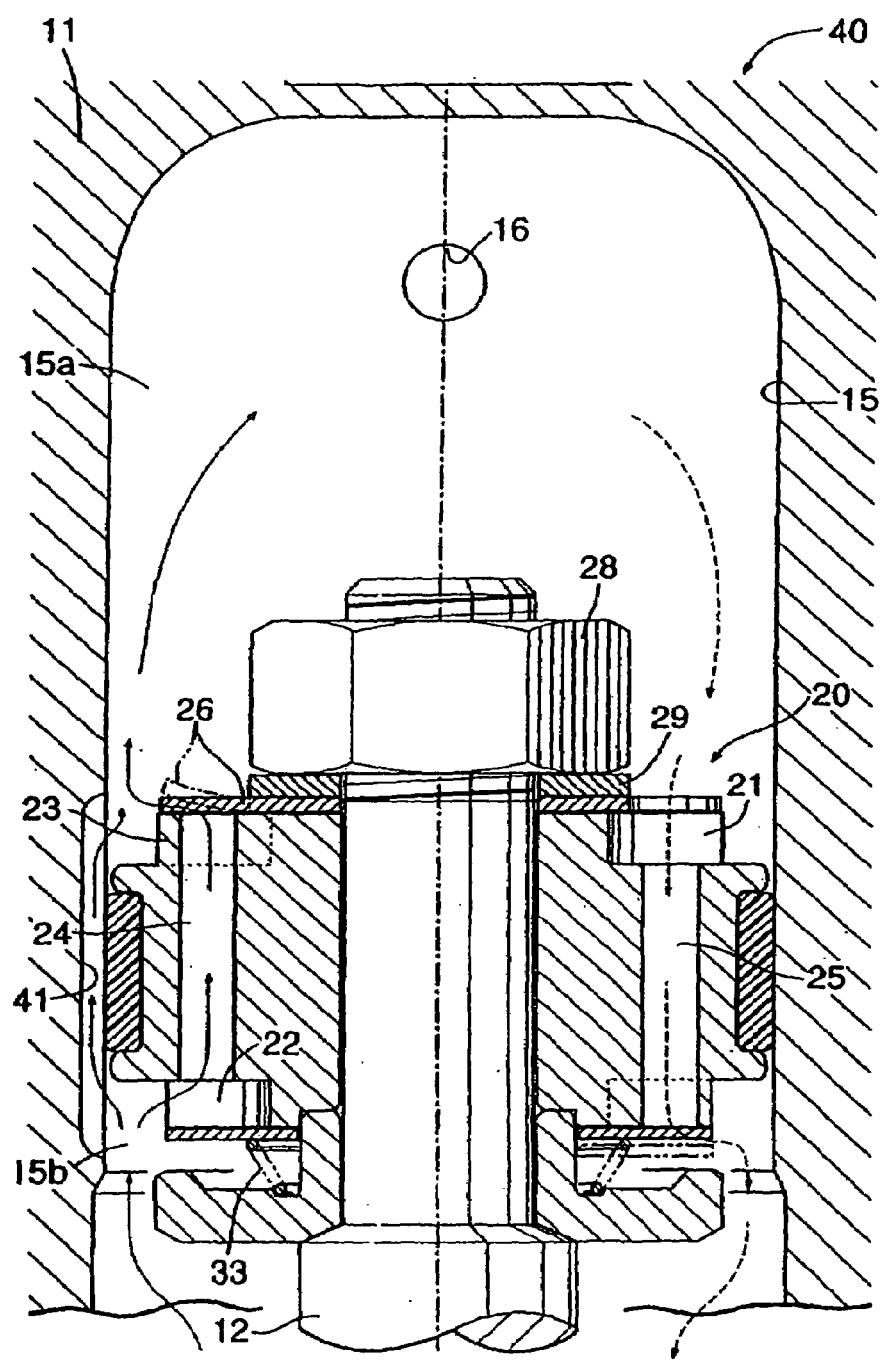
FIG. 12 is a longitudinal sectional side view showing the same as that of FIG. 11 but the operating state thereof.
Figure 13:
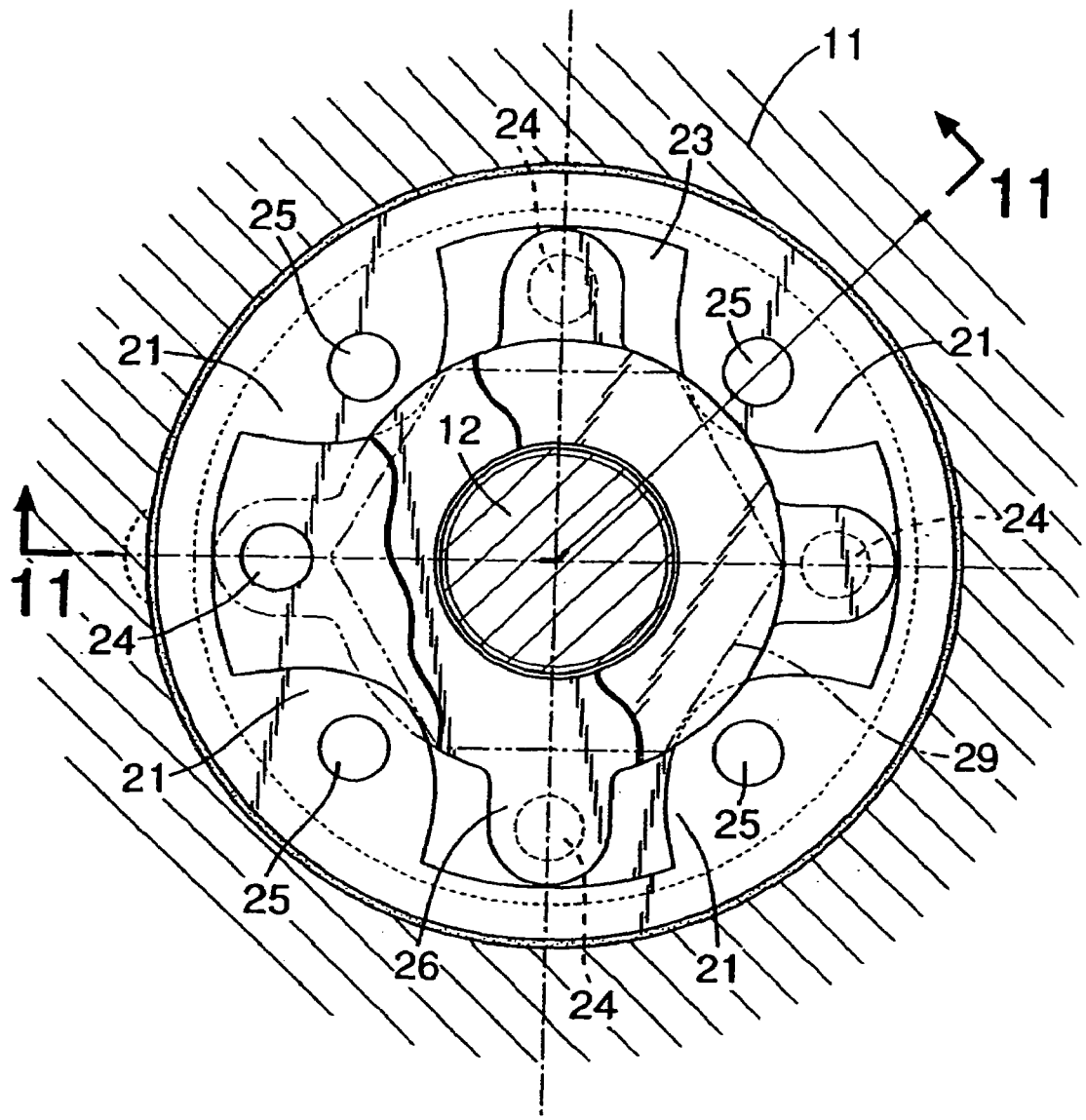
FIG. 13 is a cross-sectional view taken along line 13-13 in FIG. 11.
Figure 14:
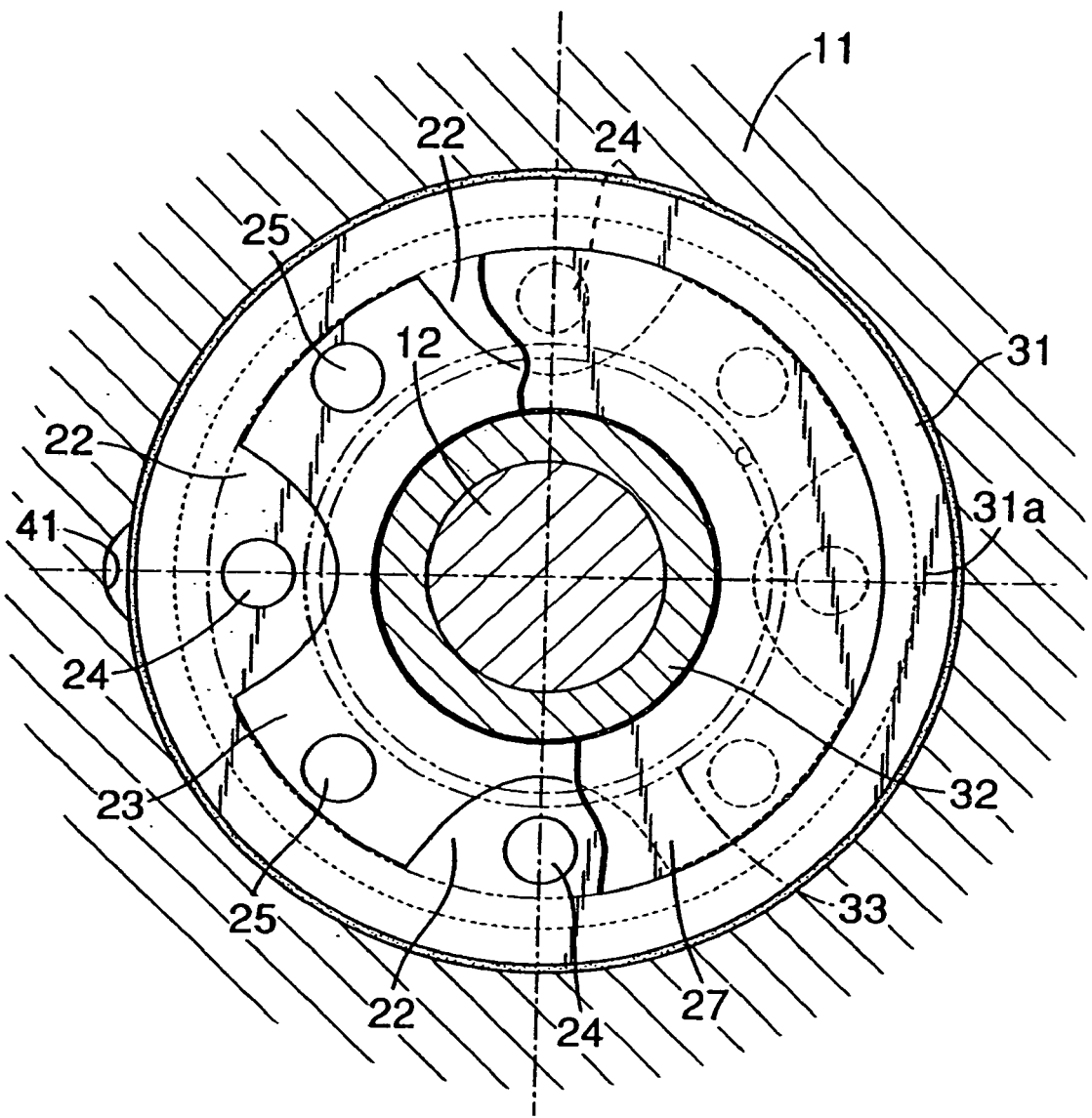
FIG. 14 is a cross-sectional view taken line 14-14 in FIG. 11.

When the damper 40 is extended to some extent and the piston body 23 reaches a location facing the groove 41 as shown in FIG. 12, the oil in the lower chamber 15b of the damper chamber 15 is allowed to flow to the upper chamber 15a through the groove 41 as denoted by solid arrows in FIG. 12. Consequently, resistance to the flowing oil becomes small. In other words, the damping coefficient of the damper 40 becomes small.

In this way, with also the damper 40, its damping coefficient, namely, the magnitude of damping force with respect to the amount of slidable displacement of the damper rod 12 is large when the damper 40 is contracted; it is smaller as the damper 40 is more extended.

On the other hand, the pressure in the upper chamber 15a of the damper chamber 15 is decreased when the damper 40 is contracted; therefore, the lower valve plate 27 is downwardly deformed at its peripheral portion against the biasing force of the valve spring 33 as denoted by the double-dashed chain line in the lower-right side in FIGS. 11 and 12. As a result, a gap is defined between the valve plate 27 and the lower end of the piston body 23, so that the oil in the upper chamber 15a is allowed to flow to the lower chamber 15b through the second through-holes 25 as denoted by dashed arrows in FIGS. 11 and 12. In this case, since the valve plate 27 is easily deformed, a damping force is scarcely generated at that time.

Thus, the steering damper device of this embodiment can provides the same function and effect as that of the first embodiment.

Figure 15:
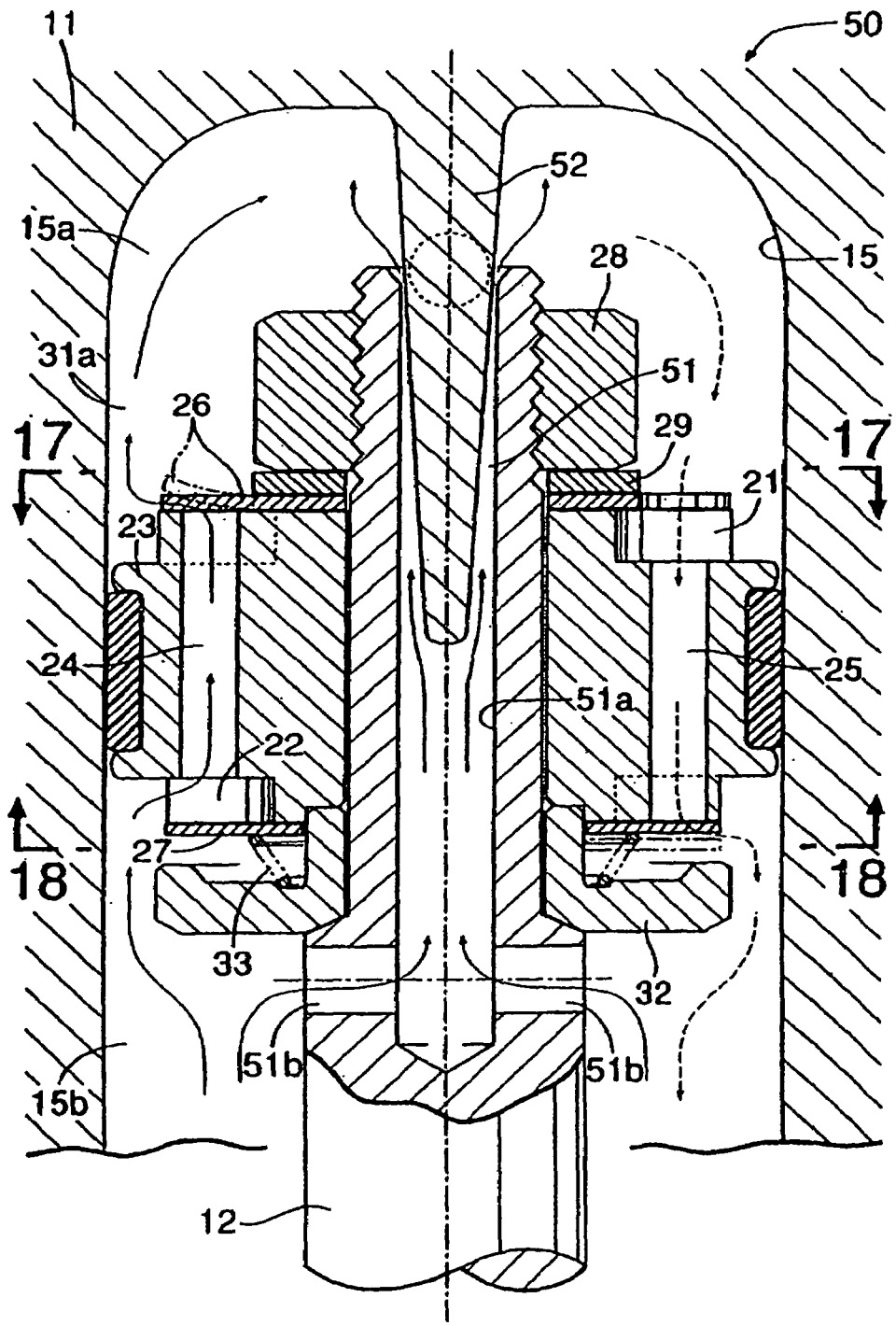
FIG. 15 is a longitudinal sectional side view showing the cylindrical damper of the steering damper device according to another embodiment of the present invention.
Figure 16:
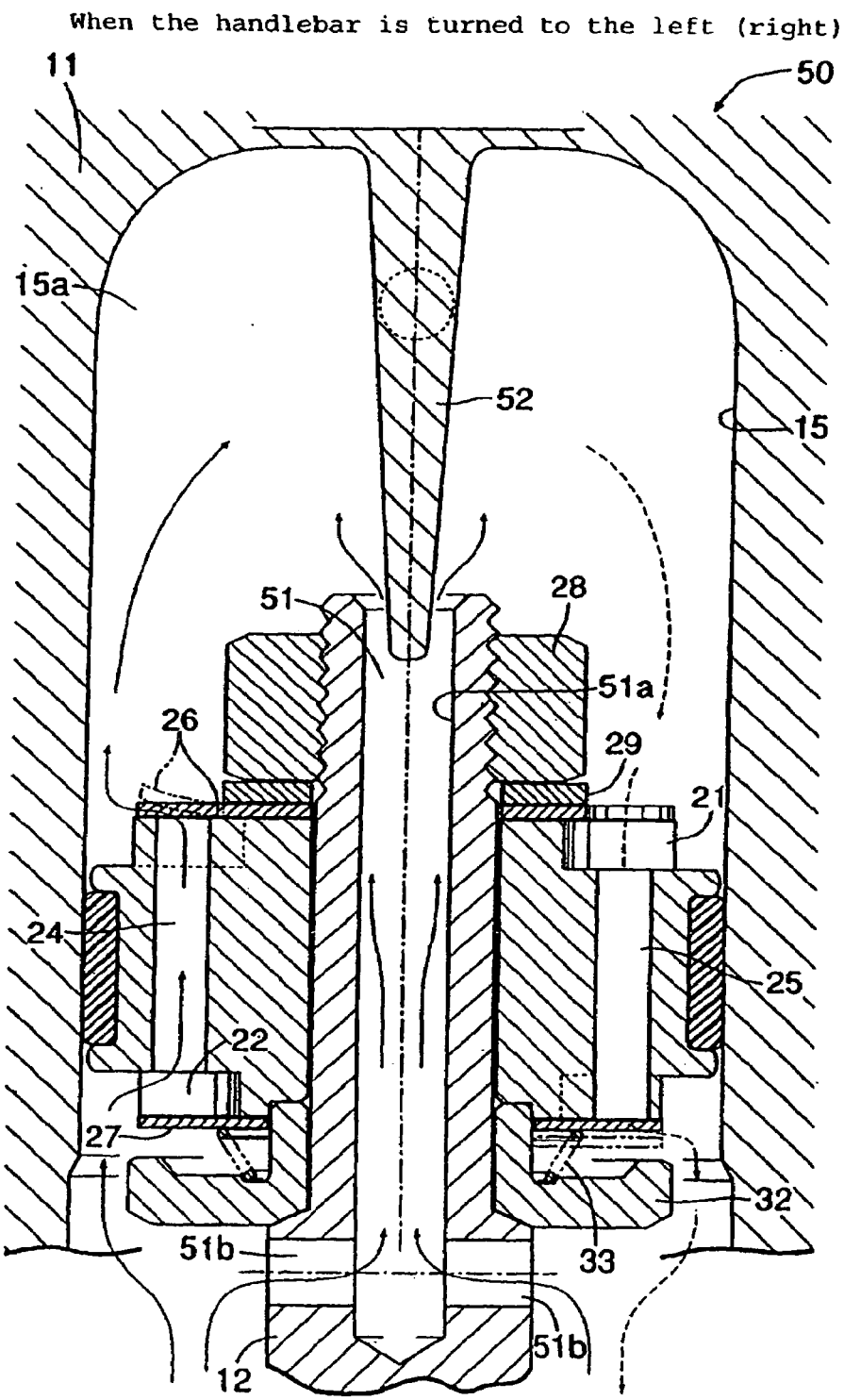
FIG. 16 is a longitudinal sectional side view showing the same as that of FIG. 15 but the operating state thereof.
Figure 17:
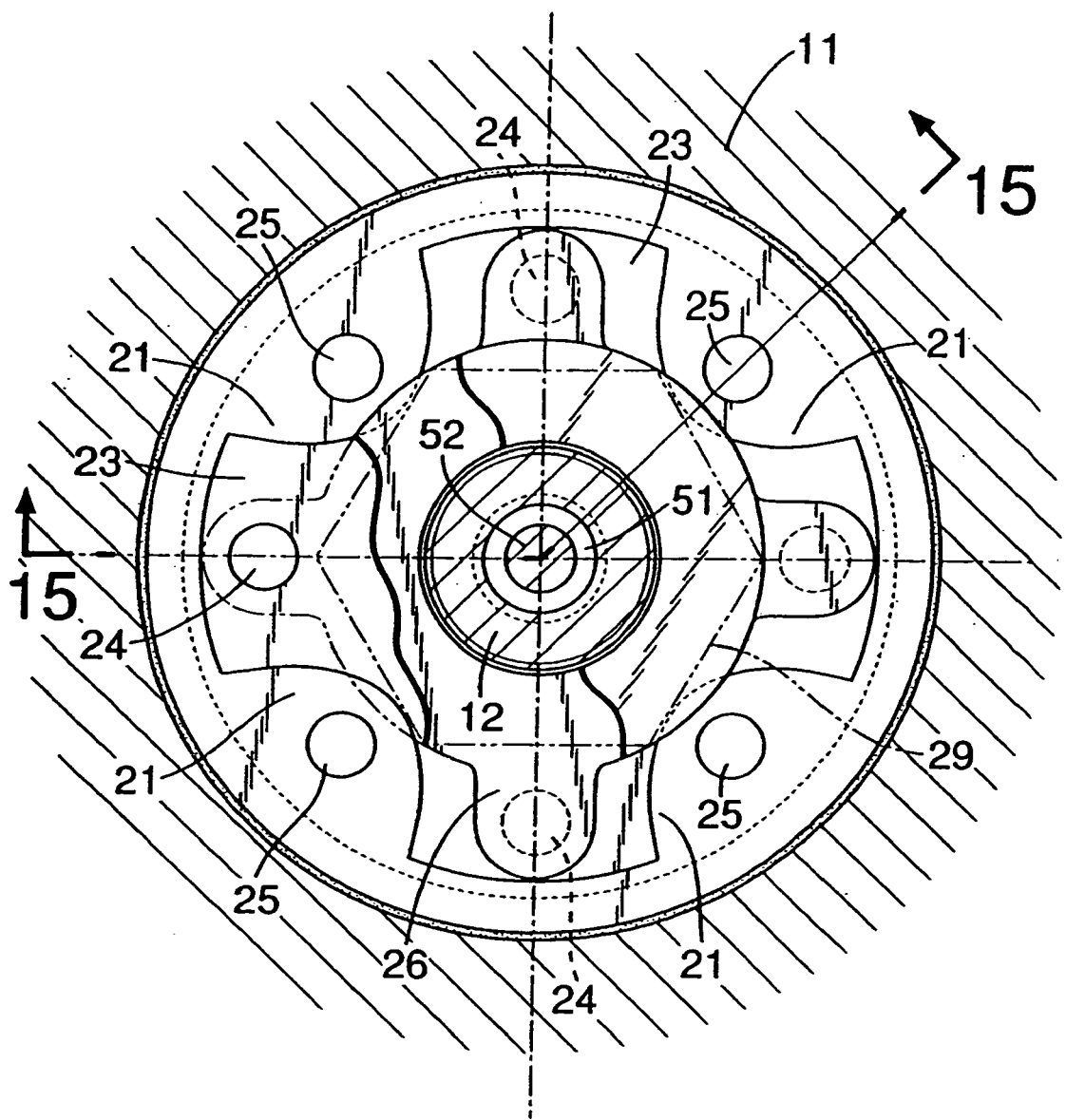
FIG. 17 is a cross-sectional view taken along line 17-17 in FIG. 15.
Figure 18:
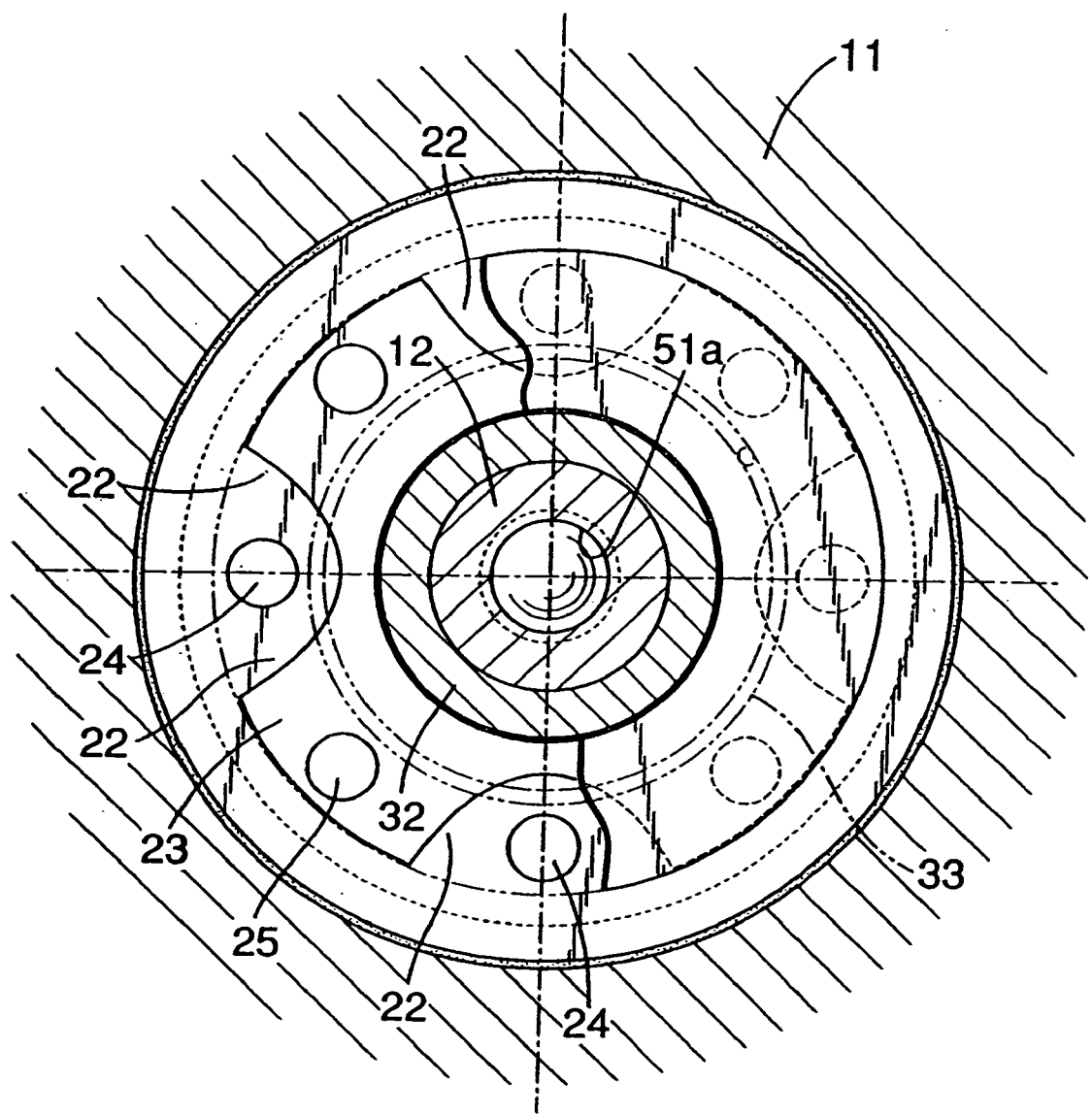
FIG. 18 is a cross-sectional view taken line 18-18 in FIG. 15.

FIGS. 15 to 18 illustrate a steering damper device according to another embodiment of the present invention. FIG. 15 is a longitudinal sectional side view of the cylindrical damper of the steering damper device. FIG. 16 is a longitudinal sectional side view showing the same as that of FIG. 15 but the operating state thereof. FIG. 17 is a cross-sectional view taken along line 17-17 in FIG. 15. FIG. 18 is a cross-sectional view taken line 18-18 in FIG. 15.

Incidentally, this embodiment is the same as the first embodiment in terms of the overall configuration but a cylindrical damper adopted. Components corresponding to those in the first embodiment are therefore denoted by the same reference numerals and the duplicate explanation will be omitted.

In place of the valve spring 30 in the cylindrical damper 10 of the first embodiment, a cylindrical damper 50 of this embodiment is provided with a passage 51 at the top end of a damper rod 12. A variable narrowing mechanism is provided in the passage 51.

In the damper 50 of this embodiment, a piston 20 attached to the top end of the damper rod 12 has the same configuration as that of this embodiment. At the top end of the damper rod 12, the passage 51 is provided which is made up of a central hole 51a and radial holes 51b. The central hole 51a opens in the upper chamber 15a of a damper chamber 15 at the upper end face of the damper rod 12 and terminates at a position lower than the mounting portion of the piston 20. The radial holes 51b are adapted to establish communication between the central hole 15a and the lower chamber 15b of the damper chamber 15. On the other hand, the damper chamber 15 is at its upper end face formed with a tapered projection 52, which protrudes from the center of the upper end face downwardly and is reduced in diameter progressively downwardly. The projection 52 is inserted into the central hole 51a at the top end of the damper rod 12.

With the steering damper device provided with the cylindrical damper 50 having such a configuration, when the handlebar 7 is in the neutral position and the damper 50 is most contracted, the upper end of the central hole 51a of the damper rod 12 faces the diameter-increased portion of the projection 52. The gap defined therebetween is, therefore, small, that is, the area of the passage 51 is small. When the handlebar 7 is turned to the right or left from this state, the damper 50 is extended, that is, the piston 20 attached to the top end of the damper rod 12 is slidably displaced toward the lower side of the damper chamber 15. The pressure in the lower chamber 15b of the damper chamber 15 is therefore increased. This allows the oil in the lower chamber 15b to pass through the passage 51 formed in the damper rod 12 as denoted by solid arrows in FIG. 15. At the same time, as with this embodiment, this allows the oil to flow from the first through-holes 24 through the gap between the valve plate 26 and the piston body 23 to the upper chamber 15a. Resistance applied to the oil at this time generates a damping force. In this case, an area defined in the passage 51 is small, and as described above, also the gap defined between the valve plate 26 and the piston body 23 is small. Thus, the damping coefficient of the damper 50 is large.

When the damper 50 is extended according to the steering angle of the handlebar 7, the upper end of the central hole 51a of the damper rod 12 will face the diameter-reduced portion of the projection 52. The area of the passage 51 is therefore increased, so that resistance to the flow of the oil is decreased. In other words, the damping coefficient of the damper 50 is decreased.

In this way, with the cylindrical damper 50, its damping coefficient, namely, the magnitude of the damping force with respect to the amount of slidable displacement of the damper rod 12 is large when the damper 50 is contracted; it is smaller as the damper 50 is more extended.

On the other hand, when the damper 50 is contracted, the pressure in the upper chamber 15a of the damper chamber 15 is increased. As with this embodiment, the oil in the upper chamber 15a is therefore allowed to flow through the second through-holes 25 to the lower chamber 15b as shown in the dashed arrows of FIGS. 15 and 16. In this case, since the valve plate 27 is easily deformed, the damping force is scarcely generated at this time.

Thus, the steering damper device of this embodiment can provide the same function and effect as those of the first embodiment.

Figure 19:
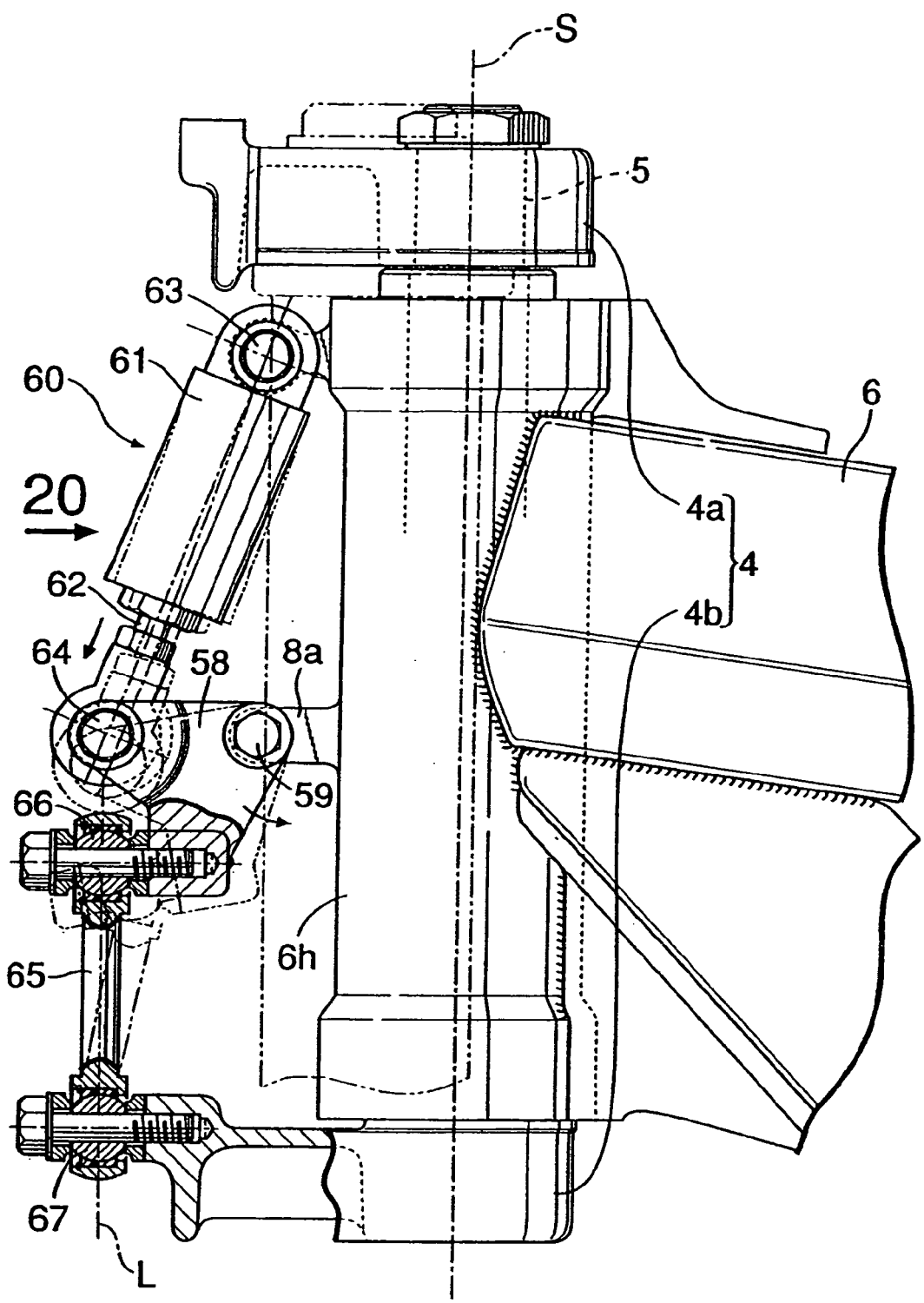
FIG. 19 is a side view of a fork bridge portion of a front fork in a motorcycle equipped with the steering damper device according to another embodiment of the present invention.
Figure 20:
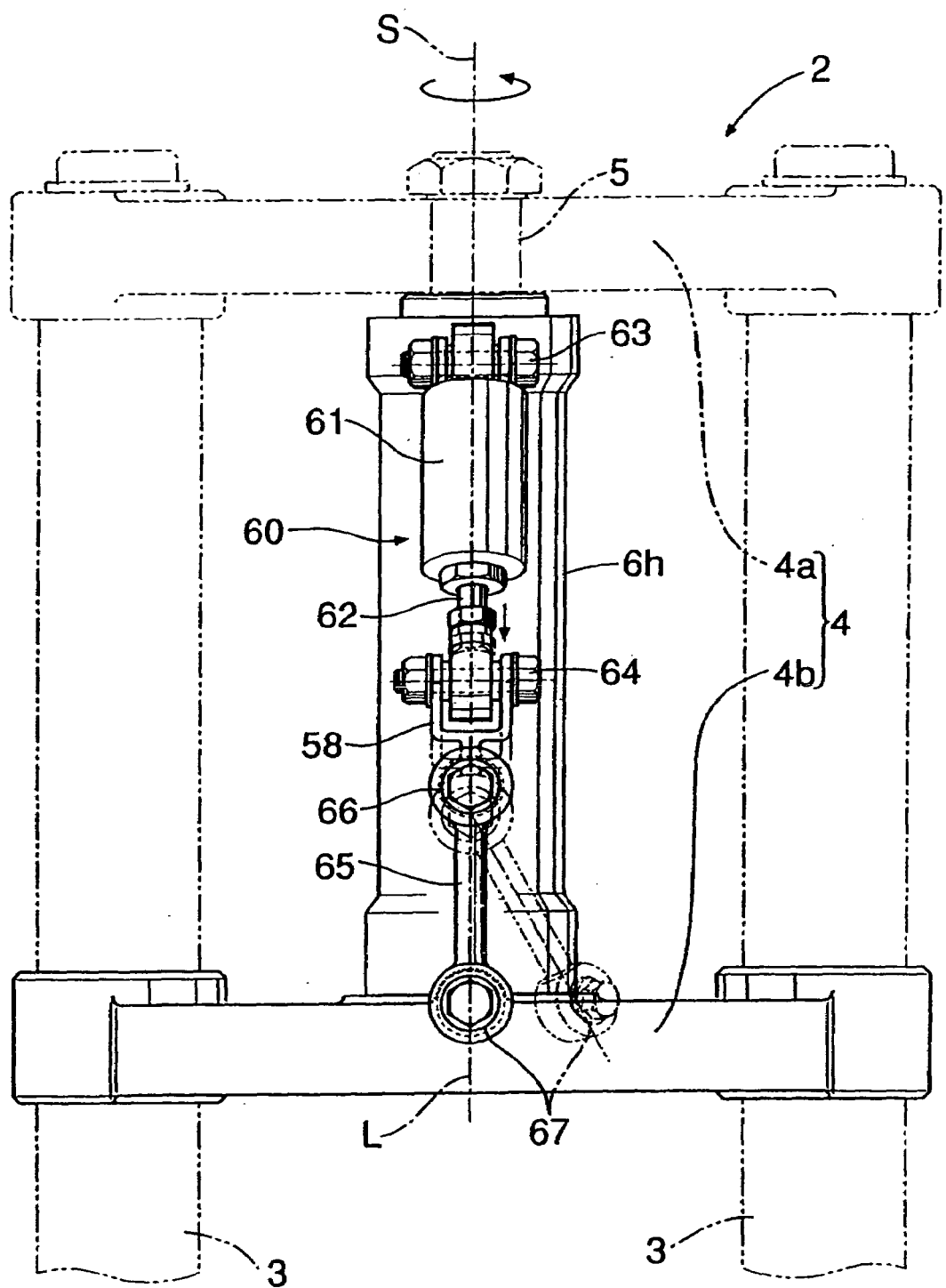
FIG. 20 is a front view as viewed from the direction of arrow 20 in FIG. 19.

FIGS. 19 and 20 illustrate a steering damper device according to another embodiment of the present invention.

In this embodiment, components corresponding to those in the first embodiment are denoted by the same reference numerals and the duplicate explanation will be omitted.

In this embodiment, as shown in FIGS. 19 and 20, a substantially triangular link lever 58 is rotatably carried by the front end of a stay 8a through a horizontal shaft 59. The stay 8a projects forwardly from the vertically central portion of a head pipe 6h. A cylindrical damper 60 is disposed between the link lever 58 and the upper end of the head pipe 6h. The damper 60 is composed of a damper casing 61 and a damper rod 62 slidably displaced within the damper casing 61. The damper casing 61 is rotatably connected to the front of the upper end of the head pipe 6h through a horizontal shaft 63. The damper rod 62 is rotatably connected to the front end of the link lever 58 through a horizontal shaft 64. On the other hand, a link rod 65 is rotatably connected to the front of the lower end of the link lever 58 through a spherical joint 66. The other end of the link rod 65 is rotatably connected through a spherical joint 67 to the front of the horizontal central portion of a bottom bridge 4b, which is a lower part of the fork bridge 4.

In this way, the cylindrical damper 60 is connected to a body frame 6 which is not turned even by operating a handlebar, while connected through the link lever 58 and the link rod 65 to the fork bridge 4 as a steering side member which is turned around a steering stem 5 by operating the handlebar. The link rod 65 is disposed in the following manner. When the handlebar 7 is in the neutral position, that is, the steering angle of the handlebar is 0°, a straight line L connecting the respective centers of the spherical joints 66, 67 is located on the central plane extending along the longitudinal direction of the vehicle body and including the central axis S of the steering stem 5. The spherical joints 66, 67 serve respectively as connecting parts at opposite ends of the link rod 65.

The cylindrical damper 60 has the same configuration as those of the aforementioned cylindrical dampers 10, 40, 50. When it is extended, a damping force is generated. In contrast, when it is contracted, the damping force is scarcely generated. In addition, its damping coefficient is large when the steering angle of the handlebar is in the vicinity of 0°; it is smaller as the steering angle is progressively changed from 0°.

The other configurations of this embodiment are the same as those of the first embodiment.

With the steering damper device configured as described above, when the handlebar 7 is turned to the left for example, then the front fork 2 is turned to the left with respect to the central axis S of the steering stem 5, whereby the bottom bridge 4b is turned in the same way. The spherical joint 67 coupled to the front center of the bottom bridge 4b is displaced to a position denoted by the double-dashed chain line in FIG. 20. As a result, the spherical joint 66 coupled to the link lever 58 is pulled down by the link rod 65 coupled to the spherical joint 67, and in turn, the link lever 58 is turned around the horizontal shaft 59 as denoted by the arrow in FIG. 19. Thus, the damper 60 is extended to apply a damping force to the bottom bridge 4b as the steering side member. Likewise, when the handlebar 7 is turned to the right, the spherical joint 66 on the side of the link lever 58 is pulled down, so that the damper is extended in the same way, generating the damping force.

If the handlebar 7 is fully turned, while the amount of extension of the damper 60 is large, the damping coefficient is designed to be small at that time. This makes the damping force generated not large so much. Thus, this also prevents the rider from feeling hard steering.

When the handlebar which has been turned to the right or left is returned to the neutral position, the damper 60 is contracted in either case, so that a damping force is scarcely generated.

In this way, the steering damper device of this embodiment can provide the same effect as that of the first embodiment. For this steering damper device, the movement of the steering side members is transmitted to the cylindrical damper 60 through the link rod 65 and the link lever 58; therefore, the damper 60 can be disposed so as to be disengaged from the steering side members and placed in any direction. Thus, the damper 60 can be arranged in a further free manner.

While the preferred embodiments of the present invention have been described so far, the invention shall not be limited to the embodiments and various modifications can be made without departing from the scope of the invention.

For example, the cylindrical damper 10 may be of a double-tube type in which a reservoir is provided on the outer circumference of the damper chamber in addition to a type in which the reservoir 17 is provided on the side of the damper chamber 15 as with each embodiment described above. A compression spring may be used in place of the compressed gas 19 for biasing the piston 18 provided on the side of the reservoir 17, and both may be provided. Further, the present invention is applicable to four-wheel buggies and other vehicles in addition to the above-mentioned motorcycles.

In addition, a cylindrical damper may be applicable in which it is the longest when the steering angle of a handlebar is near 0° and it can be disposed in the longitudinal direction of a vehicle body. In such a case, the damper is not necessarily disposed in such a manner as to be located on the central plane in the longitudinal direction of the vehicle body when the handlebar 7 is on the neutral position. The damper can be disposed in such a manner as to be slightly offset from the central plane in the longitudinal direction of the vehicle body. Further, the cylindrical damper 10 can be disposed between the body frame 6 and the top bridge 4a of the fork bridge 4 or the like.

We claim:

1. A steering damper device having a cylindrical damper provided between a steering side member and a vehicle body side member, said cylindrical damper comprising:
    a damper casing and a damper rod which is slidably displaced in said damper casing, wherein
    an amount of slidable displacement of the damper rod with respect to a steering angle of a handlebar is small when the steering angle of the handlebar is near 0° and the amount of slideable displacement is larger as the steering angle is progressively changed from 0°; and
    a damping coefficient of the cylindrical damper is large when the steering angle of the handlebar is near 0° and the damping coefficient is smaller when the steering angle is progressively changed from 0°.

2. A steering damper device having a cylindrical damper provided between a steering side member and a vehicle body side member, said cylindrical damper comprising:
    a damper casing and a damper rod which is slidably displaced in said damper casing, wherein
    a damping force applied to the steering side member from the cylindrical damper is small when a steering angle of a handlebar is near 0° and the damping force is larger as the steering angle is progressively changed from 0°; and
    a damping coefficient of the cylindrical damper is large when the steering angle of the handlebar is in the vicinity of 0° and the damping coefficient is smaller when the steering angle is progressively changed from than 0°.

3. A steering damper device having a cylindrical damper provided between a steering side member and a vehicle body side member, said cylindrical damper comprising:
    a damper casing and a damper rod which is slidably displaced in said damper casing, wherein
    an amount of slidable displacement of the damper rod with respect to a steering angle of a handlebar is small when the steering angle of the handlebar is near 0° and the amount of slidable displacement is lager as the steering angle is progressively changed from 0°;
    a damping force applied to the steering side member from the cylindrical damper is small when a steering angle of the handlebar is in the vicinity of 0° and the damping force is larger as the steering angle is progressively changed from 0°; and
    a damping coefficient of the cylindrical damper is large when the steering angle of the handlebar is in the vicinity of 0° and the damping coefficient is smaller as the steering angle is progressively changed from 0°.

* * * * *